(12) United States Patent
Nagae et al.

(10) Patent No.: US 6,671,072 B1
(45) Date of Patent: Dec. 30, 2003

(54) COLOR CONVERTING APPARATUS COLOR CONVERTING METHOD AND A RECORDING MEDIUM WITH A PROGRAM FOR MAKING COMPUTER EXECUTE THE METHOD RECORDED THEREIN

(75) Inventors: Akiko Nagae, Kanagawa (JP); Shoji Suzuki, Kanagawa (JP); Masayoshi Shimizu, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/430,190

(22) Filed: Oct. 29, 1999

(30) Foreign Application Priority Data

May 24, 1999 (JP) ............................................ 11-143094

(51) Int. Cl.$^7$ .............................. H04N 1/46; G03F 3/08
(52) U.S. Cl. ........................ 358/1.9; 358/525; 358/518; 382/167
(58) Field of Search .................... 358/1.9, 518, 525; 382/167

(56) References Cited

U.S. PATENT DOCUMENTS 4,959,711 A * 9/1990 Hung et al. .................. 358/523
5,065,234 A * 11/1991 Hung et al. .................. 358/517
5,311,332 A * 5/1994 Imao et al. .................. 358/518
5,592,591 A * 1/1997 Rolleston .................... 358/1.5
5,610,732 A * 3/1997 Komatsu ..................... 358/518
6,185,325 B1 * 2/2001 Sakaida et al. .............. 345/589
6,304,671 B1 * 10/2001 Kakutani ..................... 358/523

FOREIGN PATENT DOCUMENTS

| EP | 0 273 398 A2 | 7/1988 |
| EP | 0647 061 A1 | 4/1995 |
| EP | 0 889 439 A2 | 1/1999 |
| EP | 0 908 831 A2 | 4/1999 |
| JP | HEI 10-335460 | 11/1998 |

* cited by examiner

Primary Examiner—Edward Coles
Assistant Examiner—Jason Sherrill
(74) Attorney, Agent, or Firm—Staas & Halsey LLP

(57) ABSTRACT

A conversion parameter computing section computes conversion parameters corresponding to a position included in a partial space with one edge thereof equal to w/2 (where w is a lattice interval). When L*a*b* value for an input color is inputted, an intra-lattice position computing section computes a position in a lattice space identified by a lattice point identifying section using a conversion table. An interpolation section outputs CMY values corresponding to L*a*b* value by executing interpolation according to conversion parameters retrieved by a conversion parameter retrieving section.

10 Claims, 15 Drawing Sheets

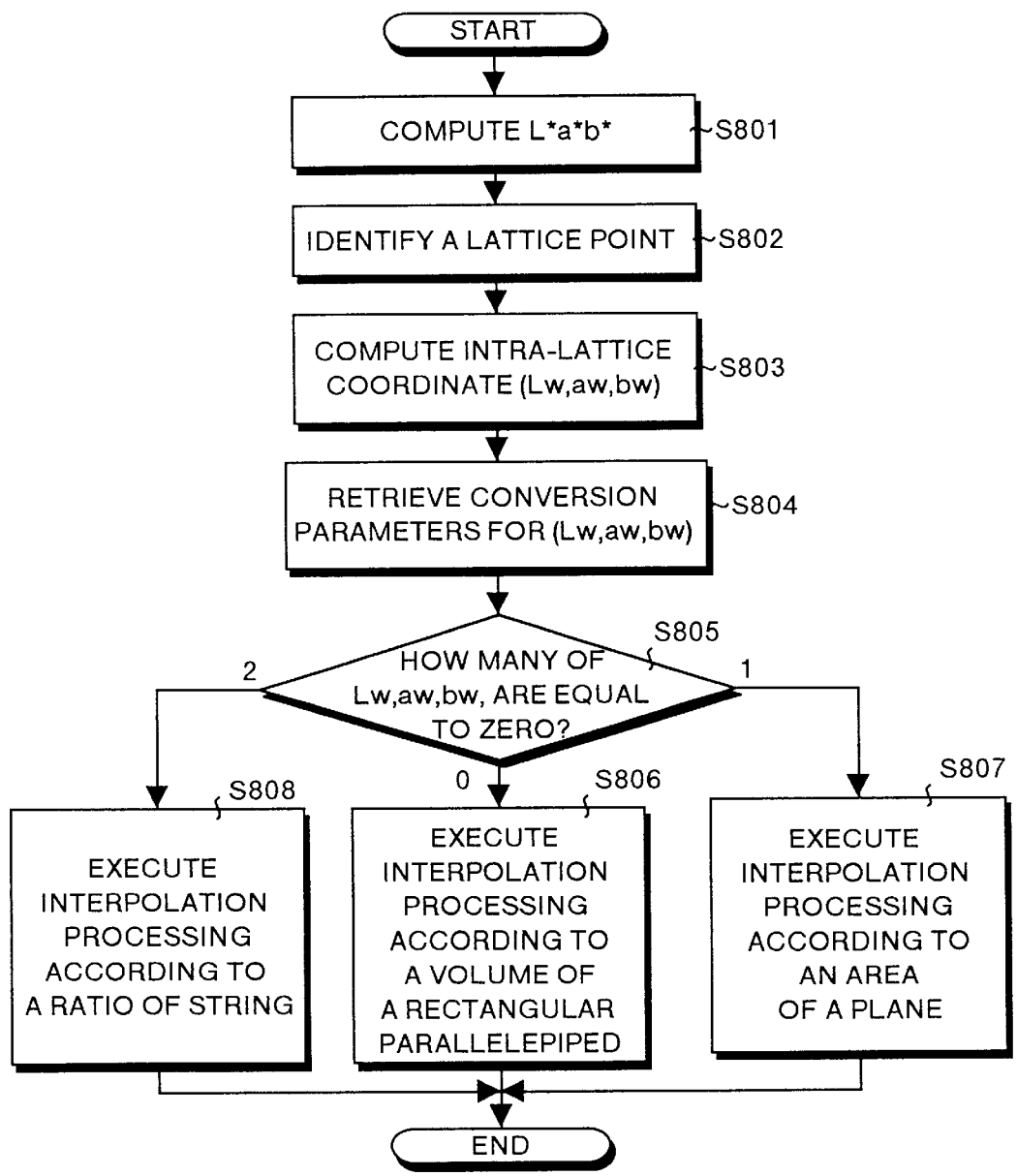

COLOR CONVERTING APPARATUS COLOR CONVERTING METHOD AND A RECORDING MEDIUM WITH A PROGRAM FOR MAKING COMPUTER EXECUTE THE METHOD RECORDED THEREIN

FIELD OF THE INVENTION

The present invention relates to a color converting apparatus having a multi-dimensional conversion table of output colors for a second color space corresponding and input colors for a first color space stored at lattice points in a multi-dimensional transformation coordinate space with a prespecified lattice interval, and which computes by interpolation the output colors corresponding to input colors at points other than the lattice points in the transformation coordinate space, a color converting method, and a recording medium. More specifically, this invention relates to a color converting apparatus capable of efficiently executing the color conversion requiring smaller memory capacity, a color converting method, and a recording medium for the same.

BACKGROUND OF THE INVENTION

In colored image equipment such as a printer or a display unit based on the conventional technology, color expression has been made by using an RBG color expression system or a CMY color expression system. However, each of these systems uses primary colors. A primary color is the one which is expressed by a color signal value dependent on each discrete equipment. Therefore, it is difficult to match the colors reproduced with one type of color image equipment to those reproduced by an another type of color image equipment. To solve this problem, recently there is often used the color converting technology in which a brightness/color difference separating system such as the L*a*b color expression system or the like is used. In this color expression system, the image color is expressed with the help of an absolute color that does not depend on the colors of the color image equipment. The color signal expressed with the L*a*b color expression system is then converted to a color system based on the CMY color expression system or others when image data is outputted to a printer.

As a representative color converting technology, there has been known the color converting technology which uses a multi-dimensional conversion table. However, but a vast memory capacity is required in order to store all of correlation between one color expression system and another color expression system. Therefore, the cube interpolation technique (Cube algorithm), in which color conversion is made by a combination of the multi-dimensional conversion table and an operation for interpolation, is widely employed. In this cube interpolation technique, a multi-dimensional conversion table is formed with a collection of lattice points each having a prespecified width, a cube on the multi-dimensional conversion table in which an input color is present is identified, and an output color is computed by means of interpolation from colors of 8 nodes within a lattice space forming the identified cube.

FIG. 15A shows a transformation coordinate space used when a color based on the L*a*b color expression system is converted to a color based on the CMY color expression system. It is assumed herein for convenience in description that, L*, a*, and b* have values that are in a range from 0 to 255. As shown in this figure, this transformation coordinate space is a three-dimensional space in which a plurality of lattice points are provided on each of the L* axis, a* axis, and b* axis, and CMY values indicating an output color is correlated to each lattice point.

More specifically, $C[L][a][b]$, $M[L][a][b]$, and $Y[L][a][b]$ each forming a color in the CMY color expression system are stored at each lattice point. L, a, b indicate lattice numbers. For instance, when w is equal to 32, L*a*b* value (0, 0, 0) corresponds to a case of L=0, a=0, and b=0, L*a*b* value (32, 0, 0) corresponds to a case of L=1, a=0, and b=0, and L*a*b* value (32, 128, 128) corresponds to a case of L=1, a=4, and b=4. Accordingly, in the cube interpolation technique, at first when $L_{conv}$, $a_{conv}$, and $b_{conv}$ are fixed, eight lattice points A1 to A8 surrounding a position ($L_{conv}$, $a_{conv}$, $b_{conv}$) are selected.

FIG. 15B is an example of a relation between the obtained eight lattice points and the position. As shown in this figure, the position ($L_{conv}$, $a_{conv}$, $b_{conv}$) of the input color is within a lattice space formed with the eight lattice points A1 to A8. Accordingly, each coordinate of the input color is divided by the lattice interval to obtain a position (Lw, aw, bw) of the input color within the lattice space. When the position of an input color within a lattice space is obtained as described above, the lattice space is divided into eight rectangular parallelepipeds according to this position as a reference as shown in FIG. 15C, and volumes V1 to V8 of the divided rectangular parallelepipeds (described as conversion parameters V1 to V8 hereinafter) are computed.

More specifically, the conversion parameters V1 to V8 are computed through the following equations:

$$V8=(w-Lw) \times (w-aw) \times (w-bw)$$

$$V7=Lw \times (w-aw) \times (w-bw)$$

$$V6=(w-Lw) \times aw \times (w-bw)$$

$$V5=Lw \times aw \times (w-bw)$$

$$V4=(w-Lw) \times (w-aw) \times bw$$

$$V3=Lw \times (w-aw) \times bw$$

$$V2=(w-Lw) \times aw \times bw$$

$$V1=Lw \times aw \times bw$$

Then an average are computed by weighting CMY values for each of the lattice points A1 to A8 according to the conversion parameters V1 to V2, and the computed average are used as CMY values for the position ($L_{conv}$, $a_{conv}$, $b_{conv}$) as an object for conversion.

As described above, in the conventional type of cube interpolation technique, at first lattice points A1 to A8 to be used for interpolation are selected, then the position (Lw, aw, bw) within a cube formed by the selected lattice points A1 to A8 are computed. Then, volume of each of the eight rectangular parallelepipeds obtained by dividing the lattice space at the computed position, namely conversion parameters V1 to V8 are computed. Finally, the interpolation is performed by using the conversion parameters V1 to V8. However, when the conversion parameters V1 to V8 are computed every time, delay in processing is generated. Therefore, generally, the conversion parameters V1 to V8 are computed beforehand for each position in the lattice space, and a required conversion parameter is retrieved when interpolation is to be performed.

With the cube interpolation technique based on the conventional technology as described above, however, it is necessary to previously compute and maintain conversion parameters V1 to V8 for all points present in a lattice space, so that there is a disadvantage that an extremely large volume of data must be maintained and a memory space is required. Especially, when a lattice interval w which corresponds to a size of one edge of the lattice space is made larger, a number of positions inside the lattice space increases, which in turn results in an increase in the amount of data of conversion parameters V1 to V8 to be stored therein.

Originally, the cube interpolation technique as described above solves the problem of higher memory capacity which occurs when color conversion is always executed with a multi-dimensional conversion table by increasing the amount of calculations. Therefore, if a large memory capacity is required for storing conversion parameters used in the cube interpolation technique, employment of the cube interpolation technique itself becomes meaningless. In the circumstances as described above, now it is strongly demanded that the memory capacity for storing conversion parameters is reduced as much as possible when color conversion is executed by using the cube interpolation technology.

SUMMARY OF THE INVENTION

The present invention was made in order to solve the problems as described above. It is an object of the present invention to provide a color converting apparatus and a color converting method, in which color conversion can efficiently be executed without requiring a large memory space when a color expressed with a color expression system is converted to a color expressed with another color expression system using the cube interpolation technique.

In order to achieve the object as described above, in the color converting apparatus according to the invention, a conversion parameter computing unit computes the conversion parameters obtained by dividing a lattice space at each position present in a partial space forming a portion of the lattice space and stores the conversion parameters in a storing unit. Then a color converting unit retrieves the conversion parameters corresponding to a position in a lattice space for the input color from the storing unit, and computes an output color for a second color space according to the retrieved conversion parameter. Therefore, color conversion can efficiently be executed even with a less memory capacity.

In the color converting method according to the invention, a conversion parameter obtained by dividing a lattice space at each position present in a partial space formed a portion of the lattice space as a reference is stored. Then the conversion parameters corresponding to a position in the lattice space for the input color are retrieved, and an output color for a second color space is computed according to the retrieved conversion parameter. Therefore, color conversion can efficiently be executed even with a less memory capacity.

In a recording medium according to the invention, a conversion parameter obtained by dividing a lattice space at each position present in a partial space formed a portion of the lattice space as a reference is stored. Then the conversion parameters corresponding to a position in the lattice space for the input color are retrieved, and an output color for a second color space is computed according to the retrieved conversion parameter. Therefore, color conversion can efficiently be executed on a computer having a less memory capacity.

Other objects and features of this invention will become apparent from the following description with reference to the accompanying drawings.

BRIEF DESCRIPTION OF THE DRAWINGS

FIG. 14 is a flow chart showing a sequence of color conversion from L*a*b values to CMY values executed by the color converting apparatus according to Embodiment 4.

DESCRIPTION OF THE PREFERRED EMBODIMENTS

Detailed description is made hereinafter for preferred embodiments of a color converting apparatus, a color converting method, and a computer-readable recording medium with a program for making a computer execute the method stored therein with reference to the attached drawings. It should be noted that the description made hereinafter is for a conversion of color signal based on L*a*b color expression system to that based on the CMY color expression system.

Figure 1A:
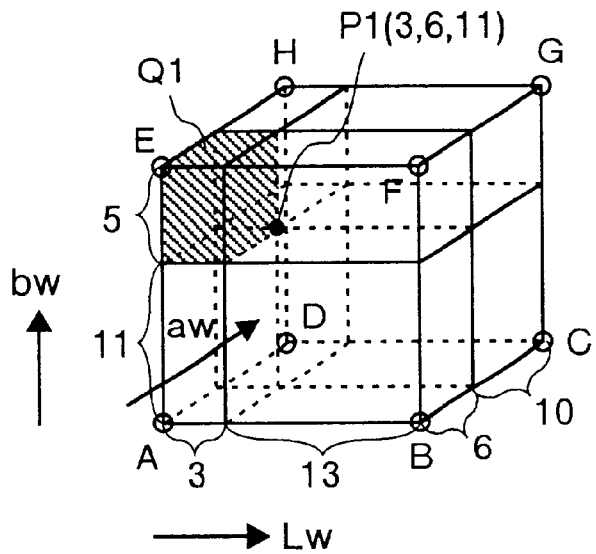
FIG. 1 explains the concepts of the color conversion processing according to Embodiment 1 of the present invention.
Figure 1B:
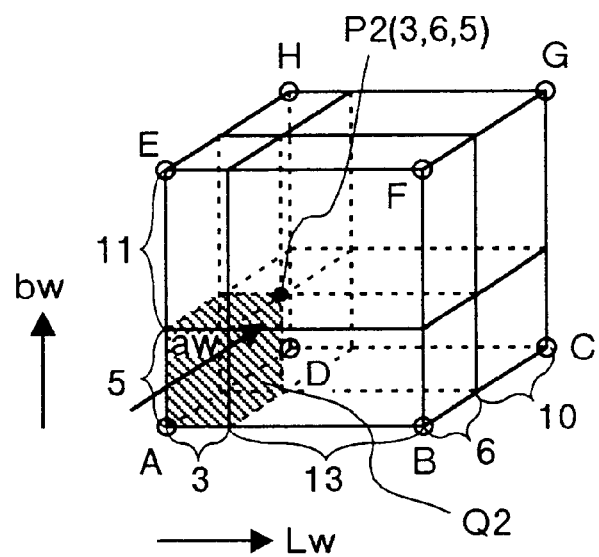

At first description is made for a concept of color conversion processing according to Embodiment 1 of the present invention. FIGS. 1A and 1B explain the concepts of color conversion processing according to Embodiment 1 of the present invention. It is assumed herein that a lattice size w is 16.

FIG. 1A shows a case where an input color P1 is present at a position (3, 6, 11) inside a lattice space, and FIG. 1B shows a case where an input color P2 is present at a position (3, 6, 5). When the cube interpolation technique based on the conventional technology is used, the conversion parameters V1 to V8 shown in FIG. 1A and conversion parameters V1 to V8 shown in FIG. 1B are discretely maintained. For instance, a rectangular parallelepiped Q1 indicated by inclined lines in FIG. 1A has the same form as the rectangular parallelepiped Q2 shown in FIG. 1B. Further, rectangular parallelepipeds each having the same form as other rectangular parallelepipeds shown in FIG. 1A are present in FIG. 1B.

As described above, with the cube interpolation technology based on the conventional technology, when the position in a lattice space is different, even if conversion parameters consist of a combination of rectangular parallelepipeds each having the same form, these conversion parameters are maintained discretely, so that a memory capacity for storing the conversion parameters increased.

In Embodiment 1 of the present invention, on the other hand, when any of coordinate components Lw, aw, and bw of a position (Lw, aw, bw) in a lattice space is large than ½ of the lattice interval w, the conversion parameters corresponding to the position (Lw, aw, and bw) are not stored. The conversion parameters of the position having a value obtained by subtracting the coordinate component from the lattice interval w are utilized as the coordinate components. Thus, a memory capacity required for storing the conversion parameter can be reduced.

More specifically, conversion parameters V1 to V8 corresponding to the position P2 shown in FIG. 1B are maintained, but conversion parameters corresponding to the position P1 shown in FIG. 1A are not maintained. The conversion parameters corresponding to the position P2 are utilized in order to interpolate the CMY values for the position P1.

Figure 2:
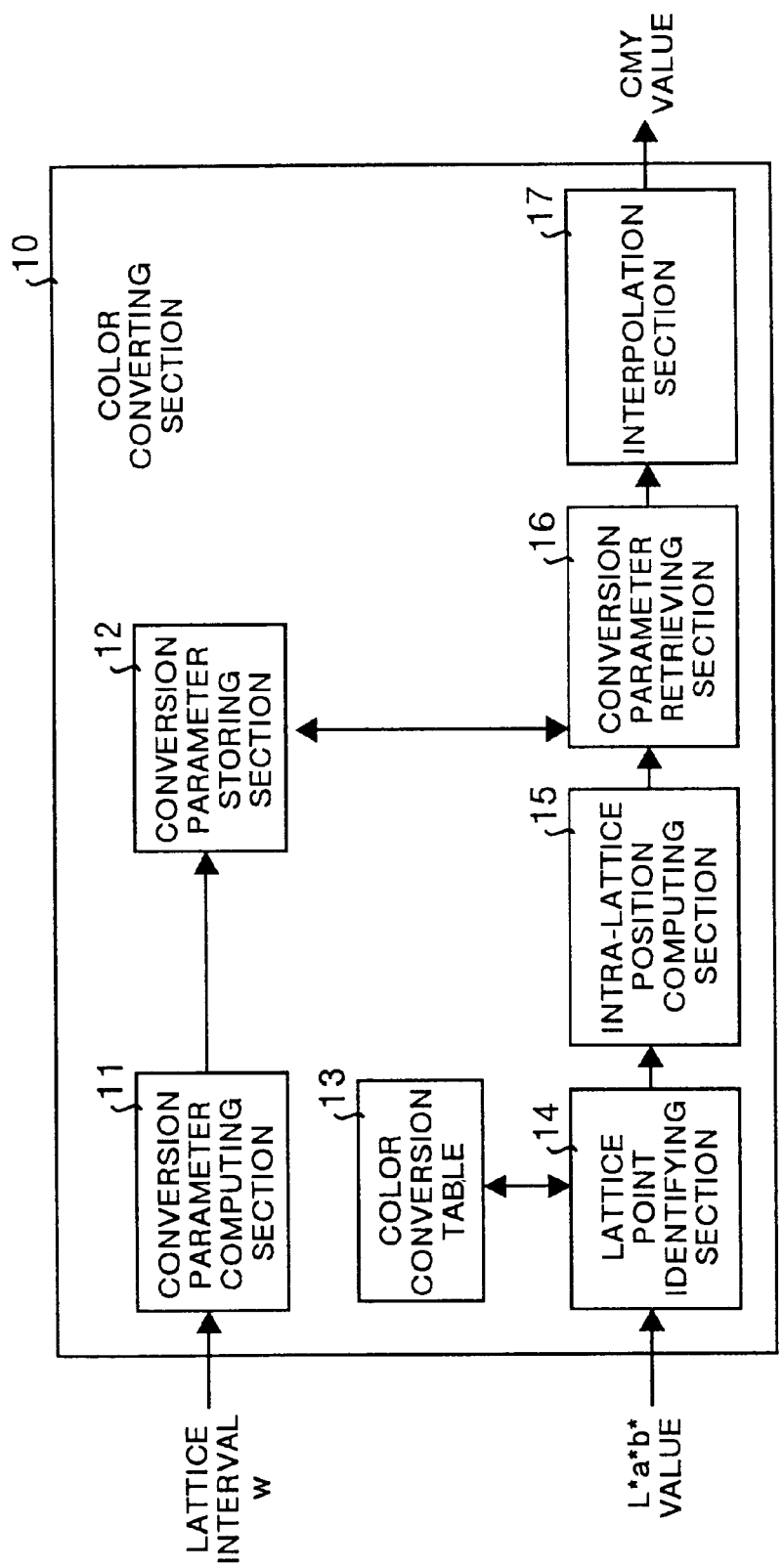
FIG. 2 is a functional block diagram which shows the configuration of a color converting apparatus according to Embodiment 1.

Configuration of the color converting apparatus according to Embodiment 1 is explained here. FIG. 2 is a functional block diagram showing configuration of a color converting apparatus 10 according to Embodiment 1. In the color converting apparatus 10 shown in FIG. 2, different from the cube interpolation technique based on the conventional technology, conversion parameters corresponding to all of the positions within a lattice space are not previously computed, and only conversion parameters corresponding to the positions each having an edge equal to w/2 are previously computed.

For instance, when the lattice interval of this lattice space is considered to be w, then w×w×w grids are present in this lattice space. With the cube interpolation technique based on the conventional technology, conversion parameters corresponding to the w×w×w positions are stored. On the contrary, in this Embodiment 1, conversion parameters corresponding to only (w/2)×(w/2)×(w/2) positions inside a lattice space having an edge of the size of w/2 are stored. Therefore, the memory capacity required for storing the conversion parameters is reduced by ⅛ of that in the conventional technology.

As shown in FIG. 2, the color converting apparatus 10 comprises a conversion parameter computing section 11, a conversion parameter storing section 12, a color conversion table 13, a lattice point identifying section 14, an intra-lattice position computing section 15, a conversion parameter retrieving section 16, and an interpolation section 17.

The conversion parameter computing section 11 computes, when the lattice interval w is received, conversion parameters corresponding to each position inside a partial space having an edge of the size of w/2. The computed conversion parameters are stored in the conversion parameter storing section 12. Namely, different from the conventional technology, this conversion parameter computing section 11 does not computes conversion parameters for all of the positions inside the lattice space, but computes only conversion parameters corresponding to the position inside a partial space having an edge of the size of w/2.

The conversion parameter storing section 12 stores the conversion parameters computed by the conversion parameter computing section 11 in correlation to each position in the partial space. Thus, when a position in the partial space is specified, conversion parameters corresponding to the specified position can be retrieved.

The color conversion table 13 is a multi-dimension conversion table in which L*a*b* values and CMY values are stored in correlation to each other. L*a*b* values and CMY values stored in this color conversion table 13 are not continuous values, but they are discrete values. For instance, assuming that L*, a*, and b* have values in the range from 0 to 255 and that the lattice space w is 16, then L*, a*, and b* can have the values 0, 16, 32, . . . , 240, 256. As a result, although such values as L*a*b* value (0, 0, 0) or L*a*b* value (16, 16, 32) are present on the color conversion table 13, such values as L*a*b* value (1, 1, 1) or L*a*b* value (15, 16, 32) are not present on this color conversion table 13. It should be noted that L*a*b* value (16, 16, 32) is expressed as L=1, a=1, and b=2 to identify a type of the lattice space.

The lattice point identifying section 14 identifies, when L*a*b* value for an input color is inputted, a lattice point for forming a lattice space in which the input color is present using the color conversion table 13. More specifically, when L*a*b* value ($L_{conv}$, $a_{conv}$, $b_{conv}$) is inputted, the lattice point identifying section 14 computes a lattice point A1 (L, a, b) through the following equations:

$L =$ int $(L_{conv}/w)$ $a =$ int $(a_{conv}/w)$ $b =$ int $(c_{conv}/w)$ and then, computes the other lattice points A2 (L+1, a, b), A3 (L, a+1, b), A4 (L+1, a+1, b), A5 (L, a, b+1), A6 (L+1, a, b+1), A7 (L, a+1, b+1), and A8 (L+1, a+1, b+1) each forming the lattice space including this lattice point A1. It should be noted that "w" is a constant indicating a lattice interval, and "int" indicates that the fractions below a decimal point are discarded.

The intra-lattice position computing section 15 divides each components of L*a*b* value a ($L_{conv}$, $a_{conv}$, $b_{conv}$) for an input color by the lattice interval and computes the coordinates of the input color within the lattice space formed with the lattice points V1 to V8 each as a vertex. More specifically, assuming that the coordinates of an input color within this lattice space is (Lw, aw, bw), the coordinates within the lattice space is computed through the following equations:

$L = L_{conv} \% w$ $a = a_{conv} \% w$ $b = b_{conv} \% w$ wherein % indicates an odd obtained through division.

The conversion parameter retrieving section 16 retrieves the conversion parameters corresponding to the position (Lw, aw, bw) computed by the intra-lattice position computing section 15. More specifically, this conversion parameter retrieving section 16 retrieves, when all of Lw, aw, and bw are smaller than w/2, conversion parameters corresponding to the position (Lw, aw, bw) from the conversion parameter storing section 12.

On the other hand, when any of Lw, aw, and bw is larger than w/2, the conversion parameter retrieving section 16 executes an operation through any of the equations of Lw=w−Lw, aw=w−aw, or bw=w−bw to adjust the component to w/2 or below, and then retrieves conversion parameters corresponding to the position (Lw, aw, bw) from the conversion parameter storing section 12.

The interpolation section 17 obtains CYM values of an input color using the CMY values of each of the lattice points in the lattice space where L*a*b* value is present and the conversion parameter retrieved by the conversion parameter retrieving section 16. More specifically, the CMY value are computed through the following equations:

$$C = \{C[L][a][b] \times V8 + C[L+1][a][b] \times V7 + \\ C[L][a+1][b] \times V6 + C[L+1][a+1][b] \times V5 + \\ C[L][a][b+1] \times V4 + C[L+1][a][b+1] \times V3 + \\ C[L][a+1][b+1] \times V2 + \\ C[L+1][a+1][b+1] \times V1\}/(w \times w \times w)$$

$$M = \{M[L][a][b] \times V8 + M[L+1][a][b] \times V7 + \\ M[L][a+1][b] \times V6 + M[L+1][a+1][b] \times V5 + \\ M[L][a][b+1] \times V4 + M[L+1][a][b+1] \times V3 + \\ M[L][a+1][b+1] \times V2 + \\ M[L+1][a+1][b+1] \times V1\}/(w \times w \times w)$$

$$Y = \{Y[L][a][b] \times V8 + Y[L+1][a][b] \times V7 + \\ Y[L][a+1][b] \times V6 + Y[L+1][a+1][b] \times V5 + \\ Y[L][a][b+1] \times V4 + Y[L+1][a][b+1] \times V3 + \\ Y[L][a+1][b+1] \times V2 + \\ Y[L+1][a+1][b+1] \times V1\}/(w \times w \times w).$$

When the conversion parameter retrieving section 16 executes the operations of Lw=w−Lw, aw=w−aw or bw=w−bw and then retrieves a conversion parameter, the conversion parameters are replaced with each other.

For instance, when the lattice interval w is 16 and the position (Lw, aw, bw) inside the lattice space is (4, 5, 9), the original parameters are computed through the following equations:

$V8 = 12 \times 11 \times 7$ $V7 = 4 \times 11 \times 7$ $V6 = 12 \times 5 \times 7$ $V5 = 4 \times 5 \times 7$ $V4 = 12 \times 11 \times 9$ $V3 = 4 \times 11 \times 9$ $V2 = 12 \times 5 \times 9$ $V1 = 4 \times 5 \times 9$.

However, as bw > (w/2), the conversion parameters for (4, 5, 7) assuming bw=w−bw; namely $V8 = 12 \times 11 \times 9$ $V7 = 4 \times 11 \times 9$ $V6 = 12 \times 5 \times 9$ $V5 = 4 \times 5 \times 9$ $V4 = 12 \times 11 \times 7$ $V3 = 4 \times 11 \times 7$ $V2 = 12 \times 5 \times 7$ $V1 = 4 \times 5 \times 7$ are used as conversion parameters, so that V4 is replaced with V8, V3 with V7, V2 with V6, and V1 with V5, and then the interpolation is performed.

Figure 3:
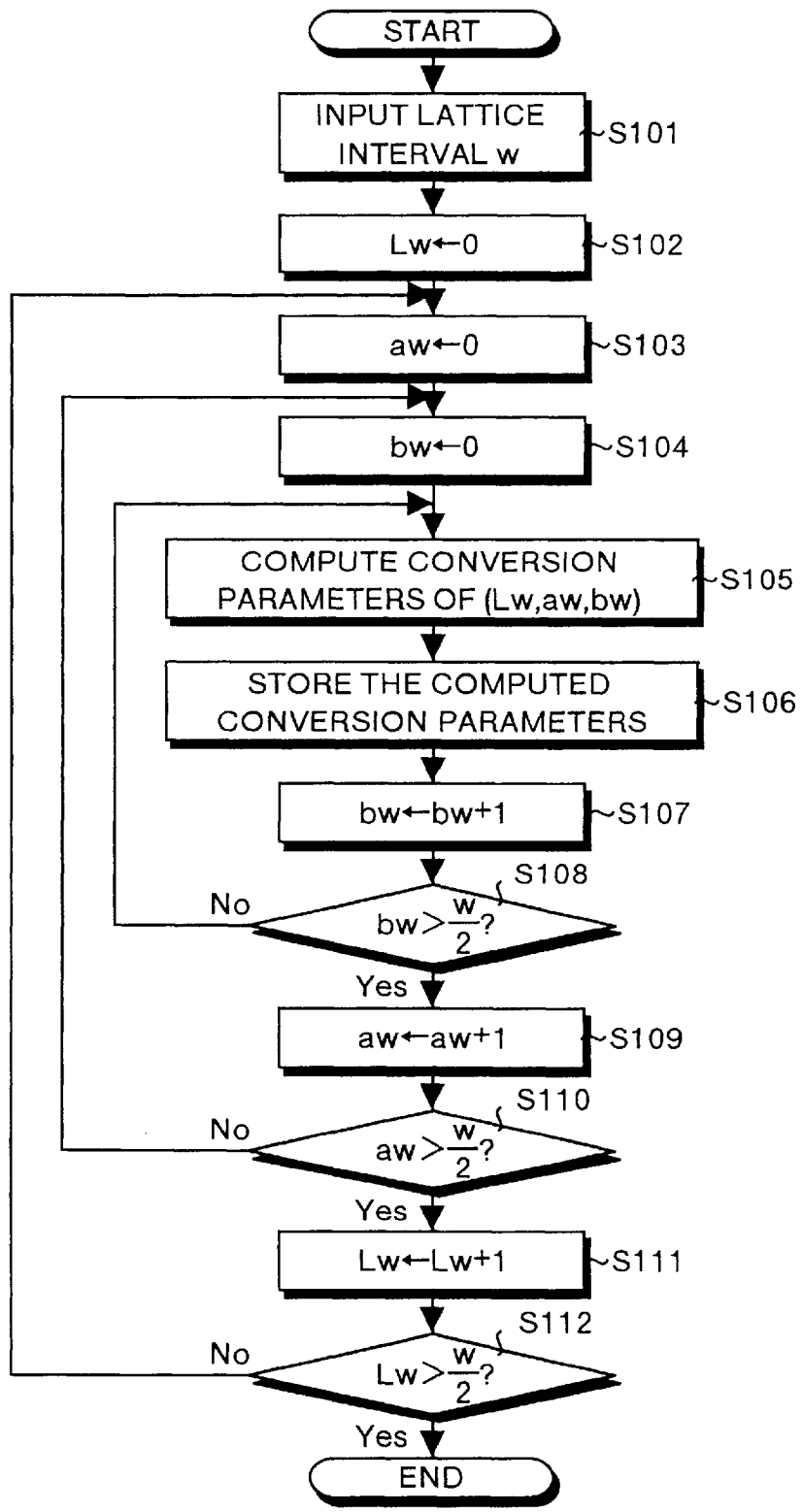
FIG. 3 is a flow chart showing a sequence of computing a conversion parameter executed by the conversion parameter computing section according to Embodiment 1.

A sequence of operations executed by the conversion parameter computing section 11 shown in FIG. 2 when computing the conversion parameter are explained here. FIG. 3 is a flow chart which shows this sequence of operations.

As shown in the figure, at first when a lattice interval w is inputted (step S101) then each of the parameters Lw, aw, and bw are initialized to zero (step S102 to S104). Then, the conversion parameters V1 to V8 at the position (Lw, aw, bw) within the lattice space are computed (step S105). The computed conversion parameters V1 to V8 are stored in the conversion parameter storing section 12 (step S106). The parameter bw is then incremented (step S107) and it is determined whether the parameter bw is greater than w/2 or not (step S108). When it is determined that the parameter bw is not greater than w/2 (step S108, negative), then the system control shifts to the step S105 and the processing for computation of the conversion parameters is repeated.

When it is determined that the parameter bw is greater than w/2 (step S108, affirmative) then the parameter aw is incremented (step S109). Then, it is determined whether the parameter aw is greater than w/2 or not (step S110) When it is determined that the parameter aw is not greater than w/2 (step S110, negative), then the system control shifts to the step S104 and the processing for computation of the conversion parameters is repeated.

When it is determined that the parameter aw is greater than w/2 (step S110, affirmative) then the parameter Lw is incremented (step Sill). Then, it is determined whether the parameter Lw is greater than w/2 or not (step S112). When it is determined that the parameter Lw is not greater than w/2 (step S112, negative) then the system control shifts to the step S103 to repeat the processing for computation of the conversion parameters. Incidentally, when it is determined that the parameter Lw is greater than w/2 (step S112, affirmative) the processing is terminated.

By executing the processing sequence described above, it is possible to compute the conversion parameters V1 to V8 corresponding to the position at which any of the parameters Lw, aw, and bw is more than zero and less then w/2. The computed conversion parameters are stored in the conversion parameter storing section 12.

Figure 4:
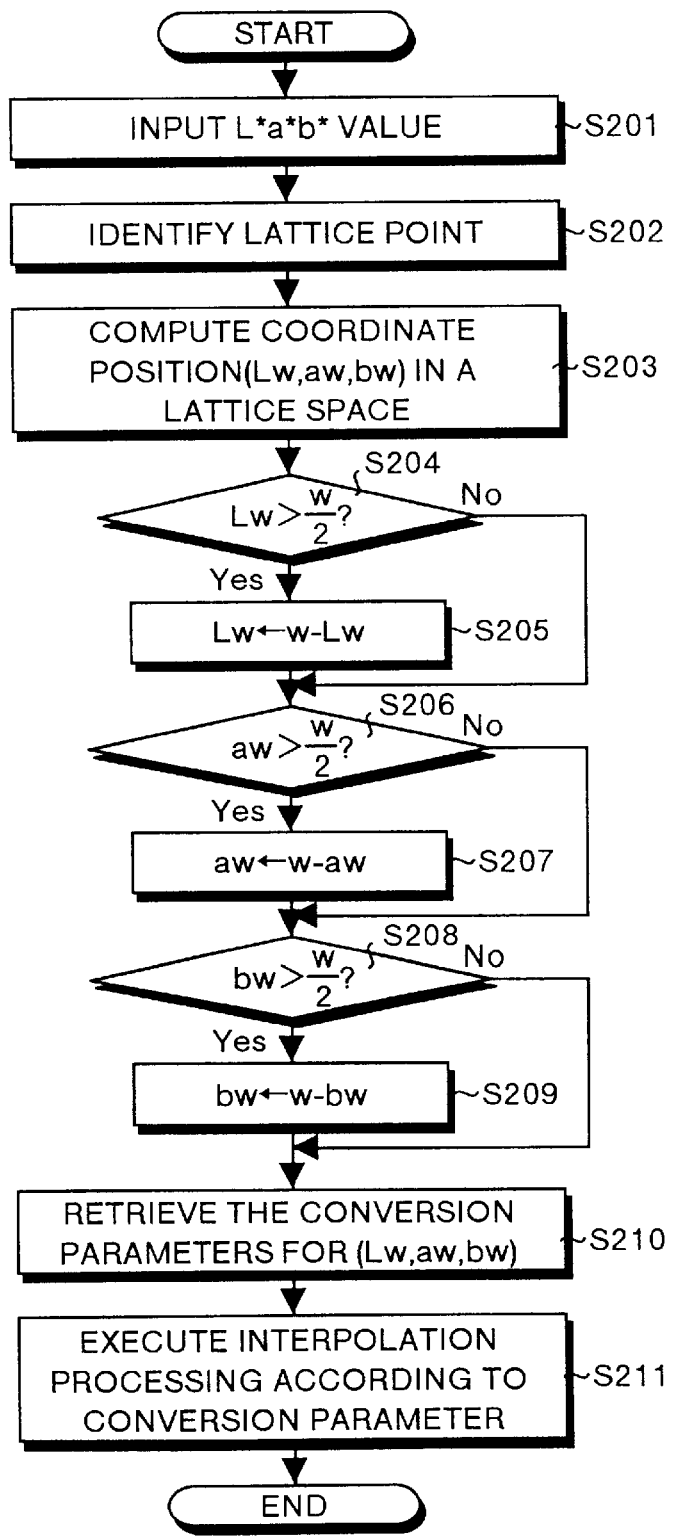
FIG. 4 is a flow chart showing a sequence of color conversion from L*a*b values to CMY values executed by the color converting apparatus according to Embodiment 1.

The sequence of operations when converting L*a*b* values to CMY values executed by the color converting apparatus 10 shown in FIG. 2 is explained here. FIG. 4 is a flow chart which explains this sequence of operations.

As shown in the figure, when L*a*b* -value for an input color is inputted (step S201) then the lattice point identifying section 14 identifies the lattice points forming a lattice space with the L*a*b* value present therein by using the color conversion table 13 (step S202). The intra-lattice position computing section 15 computes the position (Lw, aw, bw) on a lattice space with the L*a*b* value present therein (step S203). Then, the conversion parameter retrieving section 16 determines whether the Lw value is greater than w/2 or not (step S204). When it is determined that the Lw value is greater than w/2 (step S204, affirmative) then the conversion parameter retrieving section 16 uses a value obtained by subtracting the Lw value from the lattice interval w as the Lw value (step S205) When the Lw value is not greater than w/2 (step S204, negative) then the system control shifts to step S206.

Then the conversion parameter retrieving section 16 determines whether the aw value is greater than w/2 or not (step S206). When it is determined that the aw value is greater than w/2 (step S206, affirmative) then a value (w−aw) obtained by subtracting the aw value from the lattice interval w is used as the aw value (step S207). When it is determined that the aw value is not greater than w/2 (step S206, negative) then the system control immediately shifts to step S208.

Further, the conversion parameter retrieving section 16 determines whether the bw value is greater than w/2 or not (step S208). When it is determined that the bw value is greater than w/2 (step S208, affirmative) then a value (w−bw) obtained by subtracting the bw value from the lattice interval w is used as the bw value (step S209). Incidentally, when the bw value is not greater than w/2 (step S208, negative) the system control shifts to step S210.

After the Lw, aw, and bw values are checked, the conversion parameter retrieving section 16 retrieves conversion parameters for (Lw, aw, bw) from the conversion parameter storing section 12 (step S210). The interpolation section 17 then computes CMY values by performing interpolation as described above according to the retrieved conversion parameters (step S211).

By executing a series of operations as described above, it becomes possible to output CMY values corresponding to L*a*b* value for an input color by using conversion parameters corresponding to (w/2)×(w/2)×(w/2) position stored in the conversion parameter storing section 12.

Figure 5:
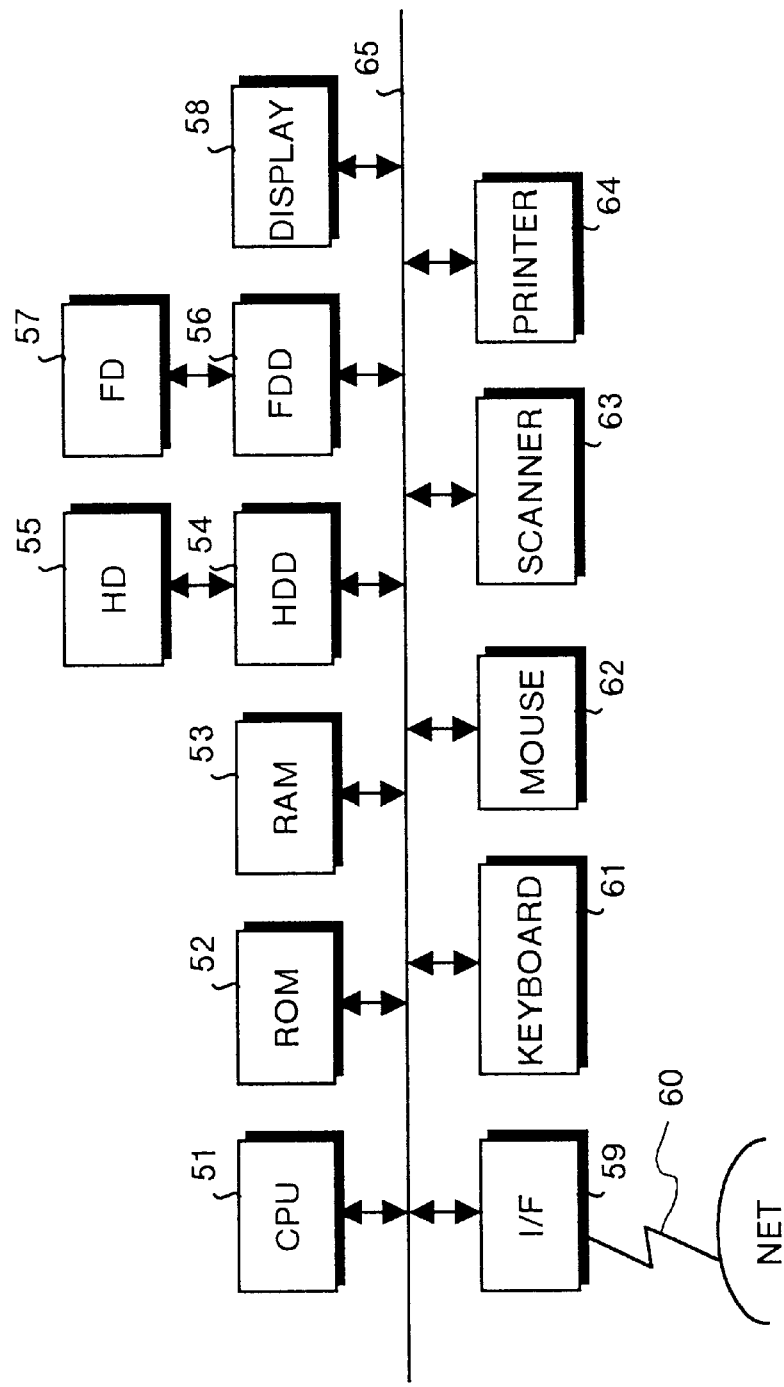
FIG. 5 is a block diagram showing hardware configuration when the color converting apparatus according to Embodiment 1 is realized with a personal computer.

Hardware configuration for realizing the color converting apparatus shown in FIG. 2 with a personal computer is explained here. FIG. 5 is a block diagram showing hardware configuration for realizing the color converting apparatus 10 shown in FIG. 2 with a personal computer.

In this figure, a CPU 51 is a central processing unit for providing controls over a personal computer as a whole, a ROM 52 is a memory in which a color conversion program for executing processing by the conversion parameter computing section 11, lattice point identifying section 14, intra-lattice position computing section 15, conversion parameter retrieving section 16, and interpolation section 17 is stored in addition to the operating system, and RAM 53 is a memory used as a work area for the CPU 51.

HDD (hard disk drive) 54 is a secondary storage device for controlling data read/write to and from a HD (Hard Disk) 55. FDD (Floppy Disk Drive) 56 is an external storage device for controlling data read/write to and from a FD (floppy Disk) under controls by the CPU 51.

Display 58 is a device for displaying documents, images, functional information or others thereon. Interface (I/F) 59 is an interface section connected via a communication line to a network for interfacing with the network.

Keyboard 61 is an input device having keys for inputting characters, numerical values, various types of instruction or the like. Mouse 62 is a pointing device used for pressing an icon or a button displayed on a display screen or for moving a window or changing a size thereof.

Scanner 63 is an input device having an OCR (Optical Character Reader) function for optically reading a color image. Printer 64 is a printing device for printing color data displayed on the screen or the like. Bus 65 is a line for connecting the components above to each other.

When the personal computer as described above is utilized as a color converting apparatus, the CPU 51 reads and executes a color conversion program stored in the ROM 52, and execute color conversion processing while storing the conversion parameters in the RAM 53, HD 55, or FD 57 according to the necessity.

When the color conversion program as described above is executed, the conversion parameter computing section 11, conversion parameter storing section 12, color conversion table 13, lattice point identifying section 14, intra-lattice position computing section 15, conversion parameter retrieving section 16, and interpolation section 17 become visible on the personal computer.

As described above, in the color converting apparatus 10 according to Embodiment 1 of the present invention, the conversion parameter computing section 11 computes the conversion parameters corresponding to the position in a partial space with one edge thereof forming a lattice space of the size of w/2 and the conversion parameter storing section 12 stores these conversion parameters. When L*a*b* value for an output color is inputted, the lattice point identifying section 14 identifies the lattice points forming a lattice space with the input color present therein by using the color conversion table 13. The intra-lattice position computing section 15 computes the positions on the lattice space. The conversion parameter retrieving section 16 retrieves the conversion parameters from the conversion parameter storing section 12, and the interpolation section 17 executes interpolation and outputs CMY values corresponding to the L*a*b* value. Therefore, memory capacity required for storing the conversion parameters in the conversion parameter storing section 12 can be reduced and hence a color based on the L*a*b* color expression system can efficiently be converted to that based on the CMY color expression system. Especially, the memory capacity required to store the conversion parameters can be reduced to ⅛ of that required in the conventional technology.

Description of Embodiment 1 above assumed that the conversion parameters corresponding to a position included in a partial space with one edge thereof equal to w/2 are stored in the conversion parameter storing section 12, but a volume of conversion parameters stored in the conversion parameter section 12 can further be reduced by taking into account coordinate transformation of the L* axis, a* axis, and b* axis.

Embodiment 2 is explained below in which a volume of conversion parameters to be stored in the conversion parameter storing section 12 is further reduced by replacing coordinates for the L* axis, a* axis, and b* axis.

Figure 6A:
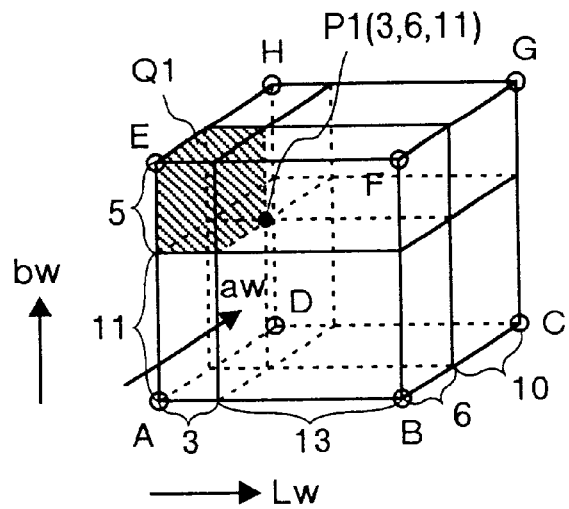
FIGS. 6A to 6C explain the concept of color conversion processing according to Embodiment 2 of the present invention.
Figure 6B:
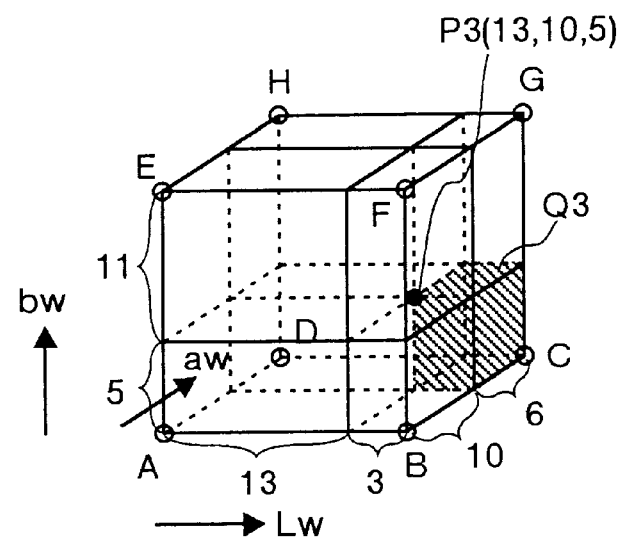
Figure 6C:
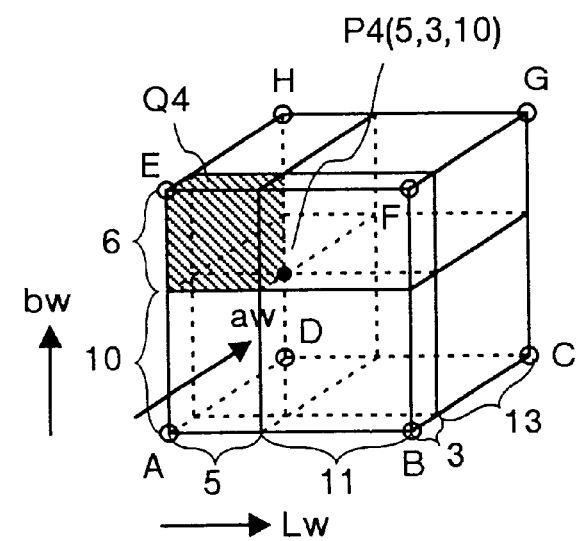

Concepts of the color conversion processing according to Embodiment 2 is explained here. FIGS. 6A to 6C explain the concepts of the color conversion according to Embodiment 2. It is assumed herein that the lattice size w is 16. FIG. 6A shows a case where an input color P1 is present at the position (3, 6, 11), FIG. 6B shows a case where an input color P3 is present at the position (13, 10, 5), and FIG. 6C shows a case where the input color P4 is present at the position (5, 3, 10).

Herein a rectangular parallelepiped Q1 shown by inclined lines in FIG. 6A has the same form as that of the rectangular parallelepiped Q3 shown by inclined lines in FIG. 6B and the rectangular parallelepiped Q4 shown by inclined lines in FIG. 6C. Further, rectangular parallelepipeds each having the same form as that in FIG. 6A are present in FIG. 6B and FIG. 6C. In this case, if the conventional type of solid interpolation technology the one described in or Embodiment 1 is applied, then the conversion parameters V1 to V8 corresponding to P1 shown in FIG. 6A, the conversion parameters V1 to V8 corresponding to P3 shown in FIG. 6B, and the conversion parameters V1 to V8 corresponding to P4 shown in FIG. 6C are discretely stored respectively.

However, conversion parameters for the positions P1, P3, and P4 comprises the same components respectively, so that it is not efficient to store each component in the multiplexed state. There, in Embodiment 2, by replacing coordinate components Lw, aw, and bw in a lattice space, conversion parameters for the positions P1, P3, and P4 are shared to reduced a memory capacity required for storing conversion parameters.

The configuration of the color converting apparatus according to Embodiment 2 is explained here. It should be noted that functional configuration of the color converting apparatus in this case is the same as that shown in FIG. 2, but processing executed by the conversion parameter computing section 11, conversion parameter retrieving section 16, and interpolation section 17 is different. Therefore, emphasis is given on the processing executed in the conversion parameter computing section 11, conversion parameter retrieving section 16, and interpolation section 17.

The conversion parameter computing section 11 computes the conversion parameters corresponding to, of the positions present in a partial space with one edge thereof equal to w/2, those satisfying the condition Lw≧aw≧bw. The computed parameters are stored in the conversion parameter storing section 12. Namely, different from the color converting apparatus according to Embodiment 1, the conversion parameter computing section 11 does not compute the conversion parameters corresponding to all the positions present in a partial space with one edge of the size of w/2, but computes only conversion parameters corresponding to the positions that satisfy the condition Lw≧aw≧bw.

The conversion parameter retrieving section 16 replaces Lw, aw, and bw computed by the intra-lattice position computing section 15 in the descending order, and retrieves conversion parameters corresponding to the position (Lw, aw, bw) consisting replaced new values Lw, aw, and bw as components. It should be noted that, when Lw, aw, and bw are greater than w/3, operations of Lw=w−Lw, aw=w−aw, and bw=w−bw are executed like in Embodiment 1.

The interpolation section 17 computes CMY values for an input color by means of interpolation using CMY values for each lattice point forming a lattice space in which the L*a*b* value is present and the conversion parameters retrieved by the conversion parameter retrieving section 16. It should be noted that, when the conversion parameter converting section 16 replaces Lw, aw, and bw when a conversion parameter is retrieved, an order of the conversion parameters to be replaces is changed.

As described above, in the color converting apparatus 10 according to Embodiment 2, only the conversion parameters corresponding to the positions satisfying the condition Lw≧aw≧bw are stored in the conversion parameter storing section 12, and the conversion parameters can be retrieved by replacing Lw, aw, and bw.

Figure 7:
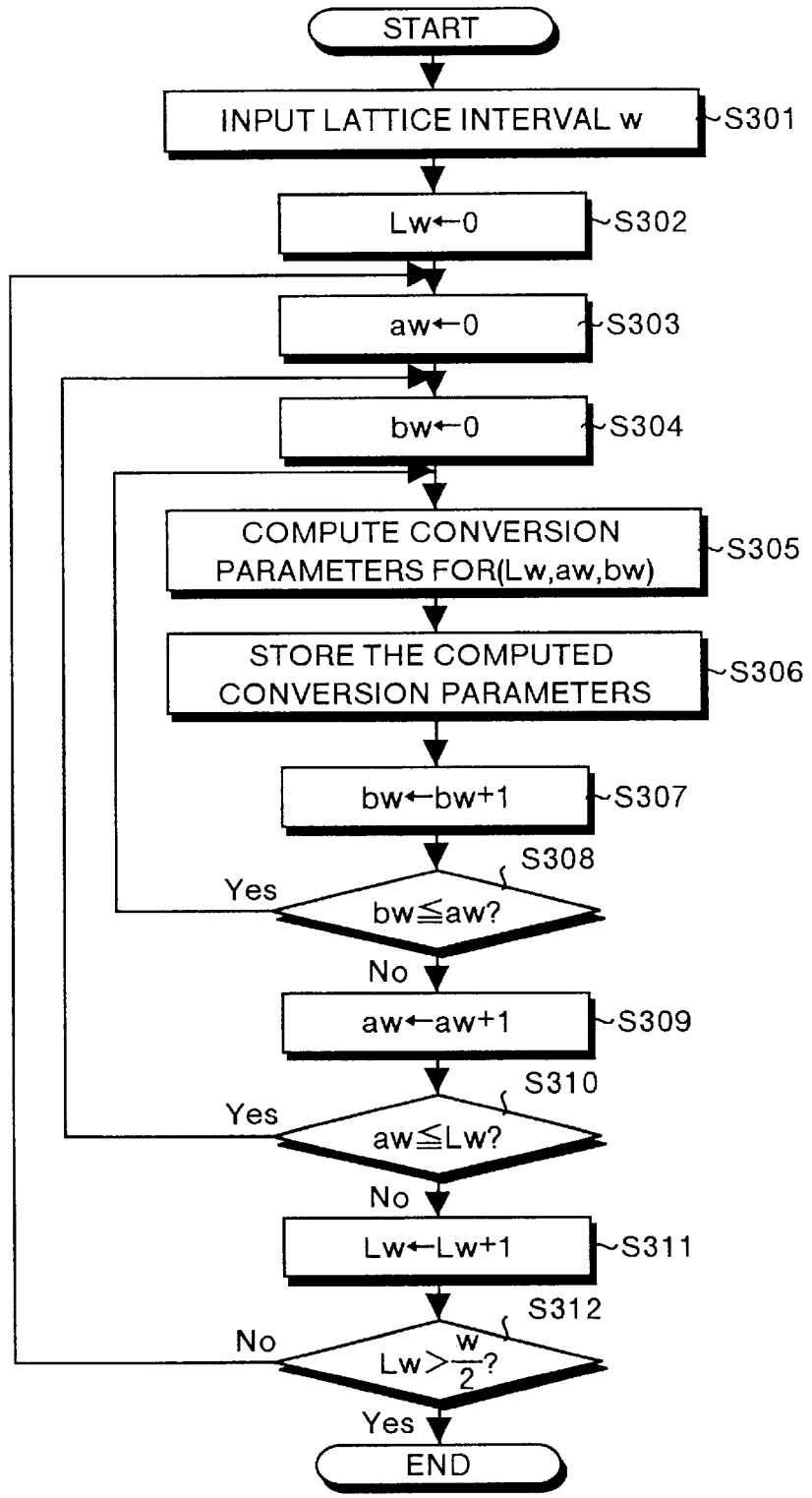
FIG. 7 is a flow chart showing a sequence of computing a conversion parameter executed by the conversion parameter computing section according to Embodiment 2.

A sequence of operations for computing the conversion parameters executed by the conversion parameter computing section 11 according to Embodiment 2 will be explained here. FIG. 7 is a flow chart which shows this sequence of operations.

As shown in the figure, at first when a lattice interval w is inputted (step S301), each of the parameters Lw, aw, and bw are initialized to zero (step S302 to S304). Then, conversion parameters V1 to V8 at the position (Lw, aw, bw) within the lattice space are computed (step S305). The computed conversion parameters V1 to V8 are stored in the conversion parameter storing section 12 (step S306). The parameter bw is then incremented (step S307) and it is determined whether this parameter bw is less than aw or not (step S308). When it is determined that the parameter bw is less than aw (step S308, affirmative), then the system control shifts to step S305 and the processing for computation of conversion parameters is repeated.

On the contrary, when it is determined that the parameter bw is greater than aw (step S308, negative) the parameter aw is incremented (step S309). Then, it is determined whether this parameter aw is less than Lw or not (step S310). When it is determined that this parameter aw is less than Lw (step S310), then the system control shifts to step S304 above and the processing for computation of the conversion parameters repeated.

When the parameter aw is greater than Lw (step S310, negative), the parameter Lw is incremented (step S311). Then, it is determined whether this parameter Lw is greater than w/2 or not (step S312). When it is determined that the parameter Lw is not greater than w/2 (step S312, negative), then the system control shifts to step S303 above and the processing for computation of the conversion parameters is repeated. On the contrary, when the parameter Lw is greater than w/2 (step S312, affirmative) then the processing is terminated.

By executing a series of operations described above, conversion parameters V1 to V8 when each of the parameters Lw, w, and bw is in a range from 0 to w/2 and at the same time the condition Lw≧aw≧bw is satisfied are obtained. The parameters Lw, aw, and bw are stored in the conversion parameter storing section 12.

Figure 8:
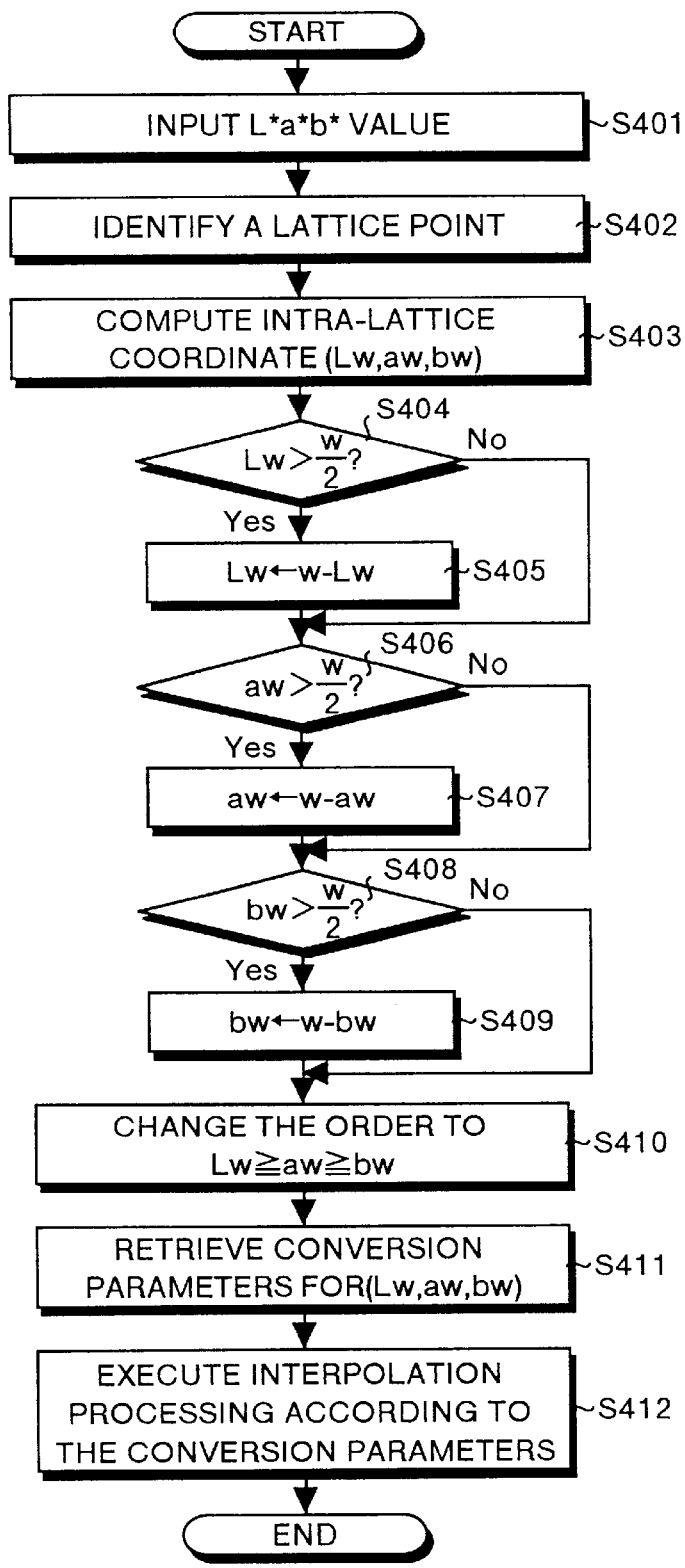
FIG. 8 is a flow chart showing a sequence of color conversion from L*a*b values to CMY values executed by the color converting apparatus according to Embodiment 2.

A sequence of operations for conversion from the L*a*b* value to CMY values executed by the color converting section according to Embodiment 2 will be explained here. FIG. 8 is a flow chart which shows this sequence of operations.

As shown in this figure, at first when L*a*b* value for an input color is inputted (step S401), the lattice point identifying section 14 identifies lattice points forming a lattice space in which the L*a*b* value is present using the color conversion table 13 (step S402). The intra-lattice position computing section 15 computes the position (Lw, aw, bw) in a lattice space in which the L*a*b* value is present (step S403). Then, the conversion parameter retrieving section 16 determines whether the Lw value is greater than w/2 or not (step S404). When this Lw value is greater than w/2 (step S404, affirmative) then a value (w−Lw) obtained by subtracting the Lw value from the lattice interval w is used as the Lw value (step S405). Incidentally, when the value is not greater than w/2 (step S404, negative) the system control shifts to step S406.

The conversion parameter retrieving section 16 determines whether the aw value is greater than w/2 or not (step S406). When this aw value is greater than w/2 (step S406, affirmative) then a value (w−aw) obtained by subtracting the aw value from the lattice interval w is used as the aw value (step S407). When the aw value is not greater than w/2 (step S406, negative) the system control shifts to step S408.

The conversion parameter retrieving section 16 then determines whether the bw value is greater than w/2 or not (step S408). When this bw value is greater than w/2 (step S408, affirmative) then value (w−bw) obtained by subtracting the bw value from the lattice interval w is used as the bw value (step S409). Incidentally, when the bw value is not greater than w/2 (step S408, negative) the system control shifts to step S410.

When checking of Lw, aw, and bw as described above is over, the conversion parameter retrieving section 16 changes an order of Lw, aw, and bw so that the condition Lw≧aw≧bw is satisfied (step S410) and retrieves the conversion parameters for (Lw, aw, bw) after the change of order from the conversion parameter storing section 12 (step S411). The interpolation section 17 computes CMY values by means of interpolation according to the retrieved conversion parameters (step S412).

By executing a series of operations described above, CMY values corresponding to the L*a*b* value for an input color can be outputted using the conversion parameters corresponding to a position satisfying the condition w/2 ≧Lw≧aw≧bw stored in the conversion parameter storing section 12.

As described above, in the color converting apparatus according to Embodiment 2, the conversion parameter computing section 11 computes the conversion parameters corresponding to the positions included in a partial space with one edge thereof forming a lattice space of the size of w/2 and also satisfying the condition Lw≧aw≧bw. The conversion parameter storing section 12 stores these conversion parameters. When L*a*b* value for an input color is inputted, the lattice point identifying section 14 identifies the lattice points forming a lattice space in which the input color is present using the color conversion table 13. Then, the intra-lattice position computing section 15 computes the positions on the lattice space. The conversion parameter retrieving section 16 retrieves the corresponding conversion parameters from the conversion parameter storing section 12, and the interpolation section 17 outputs CMY values corresponding to the L*a*b* value by means of interpolation. Therefore, memory capacity required for storing the conversion parameters in the conversion parameter storing section 12 can further be reduced, and a color based on the L*a*b* color expression system can efficiently be converted to that based on the CMY color expression system. Especially, the memory capacity required to store the conversion parameters can be reduced to 1/48 of that required in the conventional technology.

Description of Embodiment 2 above assumed a case where each coordinate component of the position (Lw, aw, bw) satisfies the condition Lw≧aw≧bw, but the present invention is not limited to this case. This invention is also applicable to a case where the condition bw≧aw≧Lw or a case where the condition aw≧Lw≧bw is satisfied. For essence of Embodiment 2 consists in that a memory capacity required for storing the conversion parameters is reduced by preparing conversion parameters when a size of each coordinate component satisfied a certain size relation.

In Embodiments 1 and 2, eight conversion parameters V1 to V8 for one position within a lattice space are stored in the conversion parameter storing section 12. However, for instance, when bw is equal to (w−bw), then volumes V1 and V5, volumes V2 and V6, volumes V3 and V7, and volumes V4 and V8 are equal to each other respectively. Therefore, if the data for each of the volumes V1 to V8 is stored discretely, then the memory capacity has not been efficiently used. A case where a number of conversion parameters to be stored for a position is to be reduced when some of the conversion parameters V1 to V8 for one position in a lattice space have the same value is explained below.

Figure 9A:
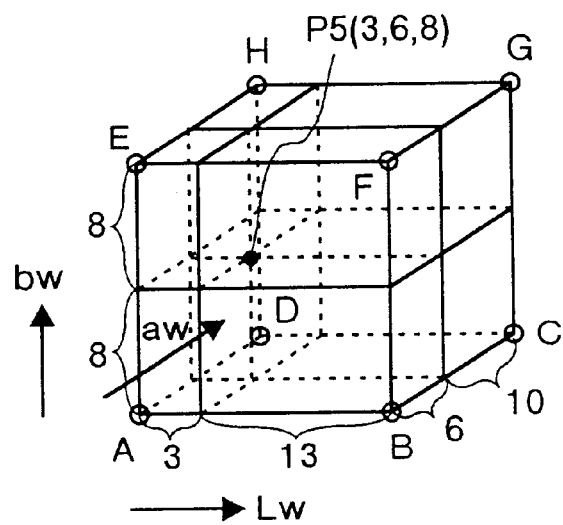
FIGS. 9A to 9C explain the concept of color conversion processing according to Embodiment 3 of the present invention.
Figure 9B:
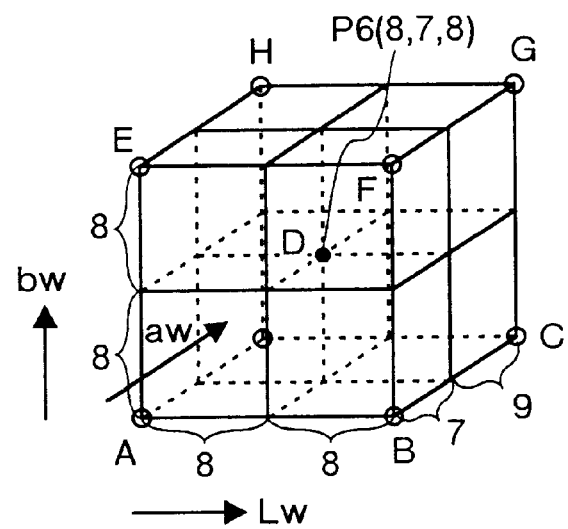
Figure 9C:
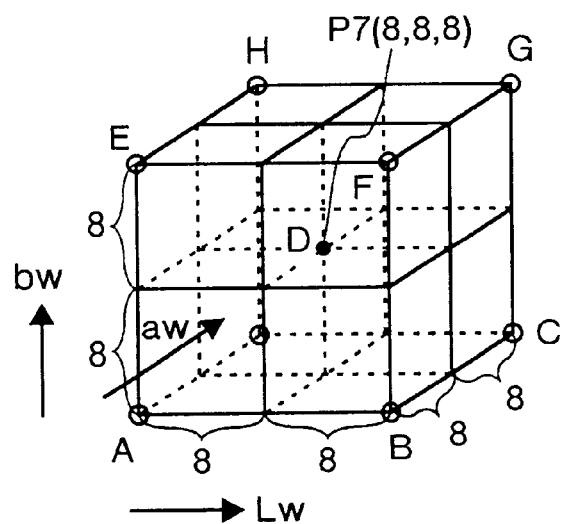

At first, the color conversion processing according to Embodiment 3 is explained. FIGS. 9A to 9C explain the concepts of the color conversion processing according to Embodiment 3. It is assumed in the following description that the lattice size w is 16.

FIG. 9A shows a case where an input color P5 inside a lattice space is at the position (3, 6, 8). In this case, since a division ration of the bw component is equal (i.e. bw=w−bw), the conversion parameters V1 to V8 become as follows:

$V8=V4=13\times10\times8$ $V7=V3=2\times10\times8$ $V6=V2=13\times6\times8$ $V5=V1=3\times6\times8.$ Accordingly, if the conversion parameters V1 to V8 are stored discretely then the memory capacity which is two times greater than the case when only the conversion parameters V1 to V4 are stored is required.

FIG. 9B shows a case where an input color P6 inside the lattice space is present at the position (8, 7, 8). In this case, since a division ratio of the Lw component is equal to that of the bw component (i.e. Lw=w−Lw, bw=w−bw), the conversion parameters V1 to V8 become as shown below:

$V8=V7=V4=V3=8\times9\times8$ $V6=V5=V2$ $V1=8\times7\times8.$

Accordingly, if the conversion parameters V1 to V8 are stored discretely, then the memory capacity which is four times greater than the case when only the conversion parameters V1 and V3 are stored is required.

FIG. 9C shows a case where an input color P7 inside the lattice space is at the position (8, 8, 8). In this case, since the division radios of Lw component, aw component, and bw component are equal to each other (i.e. 1w=w−Lw, aw=w−aw, bw=w−bw), the conversion parameters V1 to V8 become as follows:

$V8=V7=V6=V5=V4=V3=V2=V1=8\times8\times8.$

Accordingly, if the conversion parameters V1 to V8 are stored discretely then the memory capacity which is eight times greater than the case when only the conversion parameter V1 is stored is required.

In Embodiment 3, when some of the conversion parameters V1 to V8 corresponding to the position in a lattice space have the same value, the duplicated conversion parameters are not stored. Thus, memory capacity required for storing conversion parameters can be reduced.

The configuration of the color converting apparatus according to Embodiment 3 is explained here. Although the functional configuration of the color converting apparatus in this embodiment is the same as that shown in FIG. 2, the contents of processing in the conversion parameter computing section 11 and conversion parameter retrieving section 16 is different. Therefore, emphasis is given on the processing in the conversion parameter computing section 11 and conversion parameter retrieving section 16.

When a lattice interval w is received, the conversion parameter computing section 11 computes only the conversion parameters corresponding to each the positions which are present in a partial space with one edge having the size of w/2. The computed conversion parameters are stored in the conversion parameter storing section 12. If some of the computed conversion parameters V1 to V8 have the same value then the conversion parameter computing section 11 does not store all of the eight conversion parameters V1 to V8, however stores only those parameters that are not duplicated.

Concretely, the conversion parameter computing section 11 checks whether there is at least one element which is Lw=w/2, aw=w/2, or bw=w/2. When no one of Lw, aw, or bw is equal to w/2 then the conversion parameter computing section 11 computes all the eight conversion parameters V1 to V8 and stores them in the conversion parameter storing section 12. On the other hand, when any one of Lw, aw, or bw is equal to w/2, then the conversion parameter computing section 11 does not compute all the eight conversion parameters V1 to V8 but computes only those parameters which are not duplicated.

The conversion parameter retrieving section 16 retrieves the conversion parameters corresponding to the position (Lw, aw, bw) computed by the intra-lattice position computing section 15 from the conversion parameter storing section 12. However, when the retrieved conversion parameters are not V1 to V8, the conversion parameter retrieving section 16 computes the eight conversion parameters V1 to V8 according to values of Lw, aw, and bw.

As described above, in the color converting apparatus according to Embodiment 3, when some of the conversion parameters V1 to V8 corresponding to the positions in a lattice space have the same value, then the duplicated conversion parameters are not stored so that the memory capacity for storing conversion parameters is reduced.

Figure 10:
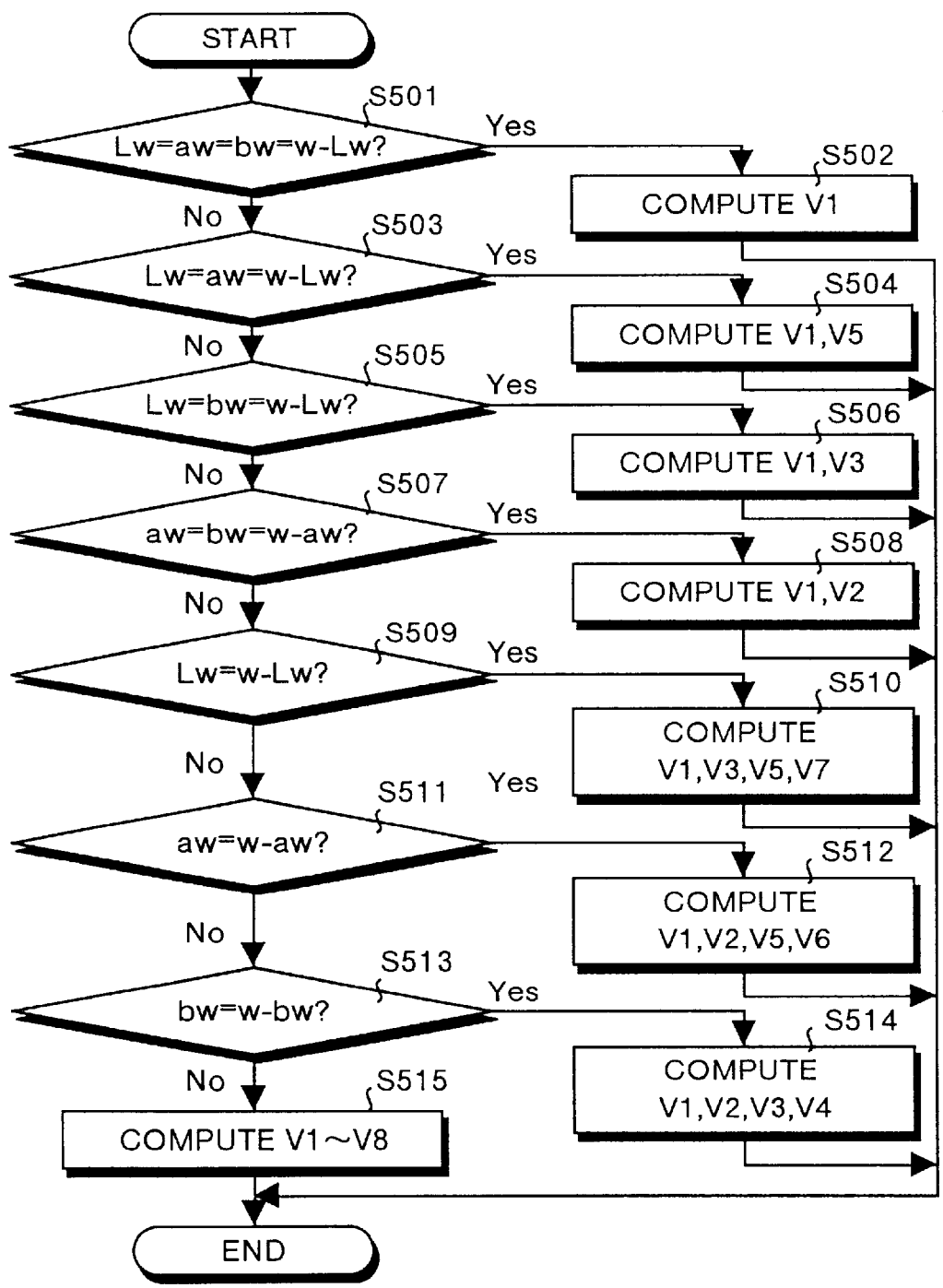
FIG. 10 is a flow chart showing a sequence of computing conversion parameter executed by the conversion parameter computing section according to Embodiment 3.

A sequence of operations for computing the conversion parameters executed by the conversion parameter computing section 11 according to Embodiment 3 will be explained here. FIG. 10 is a flow chart which shows this sequence of operations.

As shown in the figure, when computing the conversion parameters for one position (Lw, aw, bw) in a lattice space the conversion parameter computing section 11 determines whether the condition Lw=aw=bw=w−Lw is satisfied or not (step S501). When it is determined that the condition is satisfied (step S501, affirmative), then only one conversion parameter V1 is computed and stored (step S502), and the processing is terminated.

When it is determined that the above condition is not satisfied (step S501, negative), then it is determined whether the condition Lw=aw=w−Lw is satisfied or not (step S503). When it is determined that this condition is satisfied (step S503, affirmative) then two conversion parameters V1 and V5 are computed and stored (step S504), and the processing is terminated. When it is determined that the above condition is not satisfied (step S503, negative), it is determined whether the condition Lw=bw=w−Lw is satisfied or not (step S505) When it is determined that this condition is satisfied (step S505, affirmative), then two conversion parameters V1 and V3 are computed and stored (step S506), and the processing is terminated.

When it is determined that the above condition is not satisfied (step S505, negative), then it is determined whether the condition aw=bw=w−aw is satisfied or not (step S507) When it is determined that this condition is satisfied (step S507, affirmative), then two conversion parameters V1 and V2 are computed and stored (step S508), and the processing is terminated. When it is determined that the above condition is not satisfied (step S507, negative), then it is determined whether the condition Lw=w−Lw is satisfied or not (step S509). When it is determined that this condition is satisfied (step S509, affirmative), then four conversion parameters V1, V3, V5, and V7 are computed and stored (step S510), and the processing is terminated.

When it is determined that the above condition is not satisfied (step S509, negative), then it is determined whether the condition aw=w−aw is satisfied or not (step S511). When it is determined that this condition is satisfied (step S511, affirmative), then four conversion parameters V1, V2, V5, and V6 are computed and stored (step S512), and the processing is terminated. When it is determined that the above condition is not satisfied (step S511, negative), then it is determined whether the condition of bw=w−bw is satisfied or not (step S513). When it is determined that this condition is satisfied (step S513, affirmative), then four conversion parameters V1, V2, V3, and V4 are computed and stored (step S514), and the processing is terminated. When it is determined that this condition is also not satisfied (step S513, negative), then all the eight conversion parameters V1 to V8 are computed and stored (step S515), and the processing is terminated.

By executing a series of operations described above, it is not required to stores the same conversion parameters duplicatedly, and only different conversion parameters can be stored in the conversion parameter storing section 12.

Figure 11:
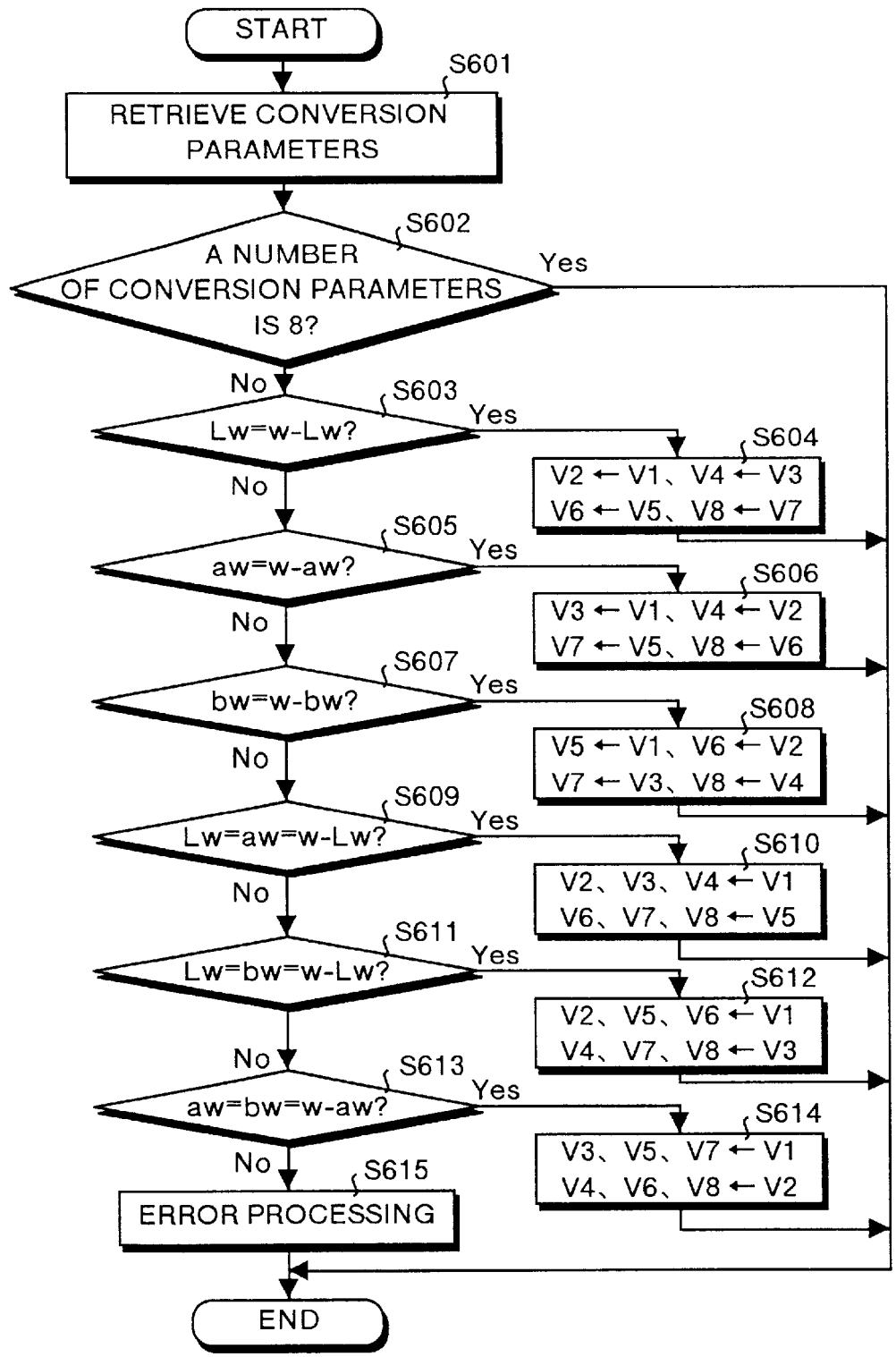
FIG. 11 is a flow chart showing a sequence of retrieving a conversion parameter executed by the conversion parameter retrieving section according to Embodiment 3.

A sequence of operations performed by the conversion parameter retrieving section 16 when retrieving the conversion parameters according to Embodiment 3 is described here. FIG. 11 shows this sequence of operations.

As shown in the figure, the conversion parameter retrieving section 16 first retrieves the conversion parameters stored in the conversion parameter storing section 12 (step S601). The conversion parameter retrieving section 16 then checks whether the number of retrieved conversion parameters is eight or not (step S602). When it is determined that the number of conversion parameters is eight, namely V1 to V8 (step S602, affirmative) then the processing is terminated. The retrieved conversion parameters are outputted to the interpolation section 17. On the other hand, when the number of conversion parameters is not eight (step S602, negative) then it is determined whether the condition Lw w−Lw is satisfied or not (step S603). When it is determined that this condition is satisfied (step S603, affirmative) then the conversion parameter V1 is substituted into the conversion parameter V3, V4 is substituted into V3, V6 is substituted into V5, and V8 is substituted into V7 (step S604), and the processing is terminated.

When it is determined that the above condition is not satisfied (step S603, negative) then it is determined whether the condition aw=w−aw is satisfied or not (step S605). When it is determined that this condition is satisfied (step S605, affirmative) then the conversion parameter V3 is substituted into the conversion parameter V1, V4 is substituted into V2, V7 is substituted into V5, and V8 is substituted into V6 (step S606), and the processing is terminated.

When it is determined that the above condition is not satisfied (step S605, negative) then it is determined whether the condition bw=w−bw is satisfied or not (step S607). When it is determined that this condition is satisfied (step S607, affirmative) then the conversion parameter V5 is substituted into the conversion parameter V1, V6 is substituted into V2, V7 is substituted into V3, and V8 is substituted into V4 (step S608), and the processing is terminated.

When it is determined that the above condition is not satisfied (step S607, negative) then it is determined whether the condition Lw=aw=w−Lw are satisfied or not (step S609) When it is determined that this condition is satisfied (step S609, affirmative) then the conversion parameter V1 is substituted into the conversion parameters V2, V3, V4, and V5 is substituted into V6, V7, V8 (step S610), and the processing is terminated.

When it is determined that the above condition is not satisfied (step S609, negative) then it is determined whether the condition Lw=bw=w−Lw is satisfied or not (step S611). When it is determined that this condition is satisfied (step S611, affirmative) then the conversion parameter V1 is substituted into the conversion parameters V2, V5, V6, and V3 is substituted into V4, V7, V8 (step S612), and the processing is terminated.

When it is determined that the above condition is not satisfied (step S611, negative) then it is determined whether the condition aw=bw=w−aw is satisfied or not (step S613). When it is determined that this condition is satisfied (step S613, affirmative) then the conversion parameter V1 is substituted into the conversion parameters V3, V5, V7, and V2 is substituted into V4, V6, V8 (step S614), and the processing is terminated. When it is determined that the above condition is also not satisfied (step S613, negative) then an error processing is executed (step S615).

By executing a series of operations described above, even when all the eight conversion parameters V1 to V8 have not been stored in the conversion parameter storing section 12, the conversion parameters which have not been stored can be obtained from the conversion parameters that have been stored.

As described above, the color converting apparatus according to Embodiment 3 of the present invention stores in the conversion parameter storing section 12 only the required and minimum conversion parameters out of the eight V1 to V8. The conversion parameter retrieving section 16 obtains the eight conversion parameters V1 to V8 from the conversion parameters retrieved from the conversion parameter storing section 12. Thus, memory capacity required for storing the conversion parameters in the conversion parameter storing section 12 can further be reduced. Accordingly, a color based on the L*a*b* color expression system can efficiently be converted to that based on the CMY color expression system. Especially, when a q number of components have an edge of the size of half of the lattice interval w, then the memory capacity required for storing the conversion parameters can be reduced down to $½^q$ as compared to that required in the conventional technology.

Embodiments 1 to 3 described above assume a case of a lattice. Namely, volumes V1 to V8 in a three dimensional space are used as conversion parameters when L*a*b* value for an input color is converted to CMY values. However, when Lw is equal to zero then the position is on aw−bw plane in the lattice space. In such a case, region can be used as conversion parameters in place of the volumes V1 to V8. Herein, the terms "area" and "areas" encompass one-dimensional lines, two-dimensional planes and three-dimensional lines. The terms "area" and "areas" are not limited to only two-dimensional planes. Further, when both Lw and aw are equal to zero, the position is present on the bw axis in the lattice space. In this case, a ratio between strings can be used as a conversion parameter.

As described above, by using the area or the ratio between strings as a conversion parameter when certain conditions are satisfied, processing speed by the interpolation section 17 can be increased. Further, number of conversion parameters to be stored in the conversion parameter storing section 12 can be reduced. Embodiment 4 of this invention in which L*a*b* value is converted to CMY values by using not only three-dimensional conversion parameters but also one-dimensional and two-dimensional conversion parameters is explained below.

Figure 12A:
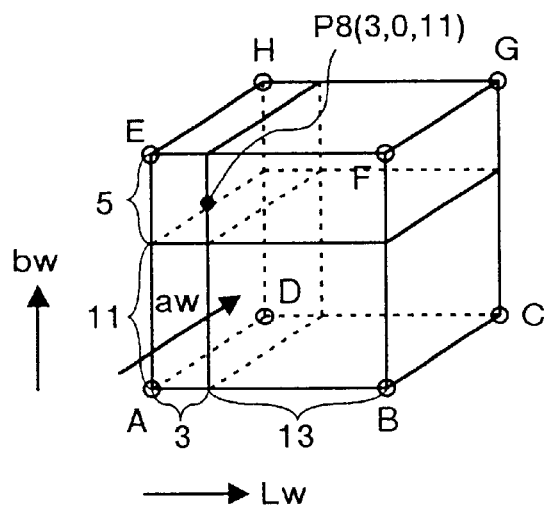
FIGS. 12A and 12B explain the concept of color conversion processing according to Embodiment 4 of the present invention.
Figure 12B:
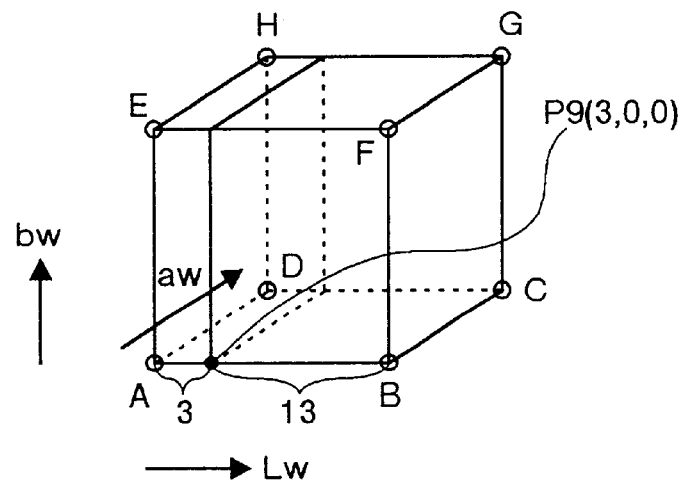

The concepts of the color conversion processing according to Embodiment 4 are explained first. FIGS. 12A and 12B explain the concepts of the color conversion processing according to Embodiment 4. It is assumed herein that the lattice size w is 16.

FIG. 12A shows a case where an input color P8 in a lattice space is present at the position (3, 0, 11). In this case, since aw is equal to zero, the position P8 is present on the ABFE plane so that a three-dimensional conversion parameter is not required to be used.

The three-dimensional conversion parameters V1 to V8 described in relation to the conventional technology can be obtained according to the following equations:

$V8=(w-Lw)\times(w-aw)\times(w-bw)$ $V7=Lw\times(w-aw)\times(w-bw)$ $V6=(w-Lw)\times aw\times(w-bw)$ $V5=Lw\times aw\times(w-bw)$ $V4=(w-Lw)\times(w-aw)\times bw$ $V3=Lw\times(w-aw)\times bw$ $V2=(w-Lw)\times aw\times bw$ $V1=Lw\times aw\times bw.$ However, since aw is equal to zero, the following expressions are obtained:

$V8=(w-Lw)\times w\times(w-bw)=13\times16\times5$ $V7=Lw\times w\times(w-bw)=3\times16\times5$ $V4=(w-Lw)\times w\times bw=13\times16\times11$ $V3=Lw\times w\times bw=3\times16\times11.$ The conversion parameters V1 to V8 are a type of weight to the lattice points, so that it is meaningless to multiply w to each of the conversion parameters V3, V4, V7 and V7.

In other words, when the three-dimensional conversion parameters are to be used even in this case, it is necessary to store the conversion parameters V1, V2, V5, V6, each of which is equal to zero, which results in increase of a required memory capacity.

In order to solve the problem, in Embodiment 4, when aw is equal to zero like at the position P8, only the two-dimensional conversion parameters V3, V4, V7, and V8 are stored so that the memory capacity of the conversion parameter storing section 12 can be reduced. These four conversion parameters are used in the interpolation.

The two-dimensional conversion parameters V3, V4, V7 and V8 in this case are as expressed by the following equations:
$V8=(w-Lw)\times(w-bw)=13\times5$
$V7=Lw\times(w-bw)=3\times5$
$V4=(w-Lw)\times bw=13\times11$
$V3=Lw\times bw=3\times11$ FIG. 12B shows a case where an input color P9 in a lattice place is present at the position (3, 0, 0). In this case, aw and bw are equal to zero. Thus, the position P9 is present on a string AB so that it is not necessary to use two-dimensional or three-dimensional conversion parameters. Accordingly, in a case like this one, conversion parameters are limited only to V7 and V8, and by executing interpolation using these two conversion parameters, a memory capacity of the conversion parameter storing section 12 can be reduced.

It should be noted that, the one-dimensional conversion parameters V7 and V8 in this case are as expressed by the following equations:

$$V8=(w-Lw)=13$$

$$V7=Lw=3.$$

The configuration of the color converting apparatus according to Embodiment 4 of the present invention is explained below. Although the functional configuration of the color converting apparatus in this embodiment is the same as that shown in FIG. 2, the contents of processing in the conversion parameter computing section 11, conversion parameter retrieving section 16, and interpolation section 17 is different. Therefore, emphasis is given only on the processing in the conversion parameter computing section, conversion parameter retrieving section 16, and interpolation section 17.

Of the coordinate components for a position present in a lattice space.(Lw, aw, bw), when all of Lw, aw, and bw are not equal to zero, the conversion parameter computing section 11 computes three-dimensional conversion parameters consisting of eight elements V1 to V8 and stores the computed conversion parameters in the conversion parameter storing section 12. When any one of Lw, aw, and bw is equal to zero, the conversion parameter computing section 11 computes two-dimensional conversion parameters comprising four elements and stores the computed conversion parameters in the conversion parameter storing section 12. When any two of Lw, aw, and bw are equal to zero, the conversion parameter computing section 11 computes one-dimensional conversion parameters consisting of two elements, and stores the computed conversion parameters in the conversion parameter storing section 12.

The conversion parameter retrieving section 16 retrieves the conversion parameters computed by the intra-lattice position computing section 15 and corresponding to the position (Lw, aw, bw) from the conversion parameter storing section 12. In this conversion parameter retrieving section 16, two, four, or eight conversion parameters are retrieved for one position according to how many of Lw, aw, and bw are equal to zero.

The interpolation section 17 computes CMY values for an input color by means if interpolation using CMY values for each lattice point forming a lattice space and conversion parameters retrieved by the conversion parameter retrieving section 16.

More specifically, when all of Lw, aw, and bw are not equal to zero, the interpolation section 17 computes CMY values through the following equations:

$$C = \{C[L][a][b] \times V8 + C[L+1][a][b] \times V7 +$$
$$C[L][a+1][b] \times V6 + C[L+1][a+1][b] \times V5 +$$
$$C[L][a][b+1] \times V4 + C[L+1][a][b+1] \times V3 +$$
$$C[L][a+1][b+1] \times V2 +$$
$$C[L+1][a+1][b+1] \times V1\}/(w \times w \times w)$$

$$M = \{M[L][a][b] \times V8 + M[L+1][a][b] \times V7 +$$
$$M[L][a+1][b] \times V6 + M[L+1][a+1][b] \times V5 +$$
$$M[L][a][b+1] \times V4 + M[L+1][a][b+1] \times V3 +$$
$$M[L][a+1][b+1] \times V2 +$$
$$M[L+1][a+1][b+1] \times V1\}/(w \times w \times w)$$

$$Y = \{Y[L][a][b] \times V8 + Y[L+1][a][b] \times V7 +$$
$$Y[L][a+1][b] \times V6 + Y[L+1][a+1][b] \times V5 +$$
$$Y[L][a][b+1] \times V4 + Y[L+1][a][b+1] \times V3 +$$
$$Y[L][a+1][b+1] \times V2 +$$
$$Y[L+1][a+1][b+1] \times V1\}/(w \times w \times w).$$

When, for instance, aw is equal to zero, the CMY values are computed through the following equations:

$$C = \{C[L][a][b] \times V8 + C[L+1][a][b] \times V7 +$$
$$C[L][a][b+1] \times V4 + C[L+1][a][b+1] \times V3\}/(w \times w)$$

$$M = \{M[L][a][b] \times V8 + M[L+1][a][b] \times V7 +$$
$$M[L][a][b+1] \times V4 + M[L+1][a][b+1] \times V3\}/(w \times w)$$

$$Y = \{Y[L][a][b] \times V8 + Y[L+1][a][b] \times V7 +$$
$$Y[L][a][b+1] \times V4 + Y[L+1][a][b+1] \times V3\}/(w \times w)$$

Further, when both aw and bw are equal to zero, the CMY values are computed through the following equations:

$$C=\{C[L][a][b] \times V8 + C[L+1][a][b] \times V7\}/w$$

$$M=\{M[L][a][b] \times V8 + M[L+1][a][b] \times V7\}/w$$

$$Y=\{Y[L][a][b] \times V8 + Y[L+1][a][b] \times V7\}/w.$$

As described above, in the color converting apparatus according to Embodiment 4, three-dimensional, two-dimensional, or one-dimensional conversion parameters are used according to how many of Lw, aw, and bw are equal to zero. Thus, number of conversion parameters to be stored in the conversion parameter storing section 12 can be reduced.

Figure 13:
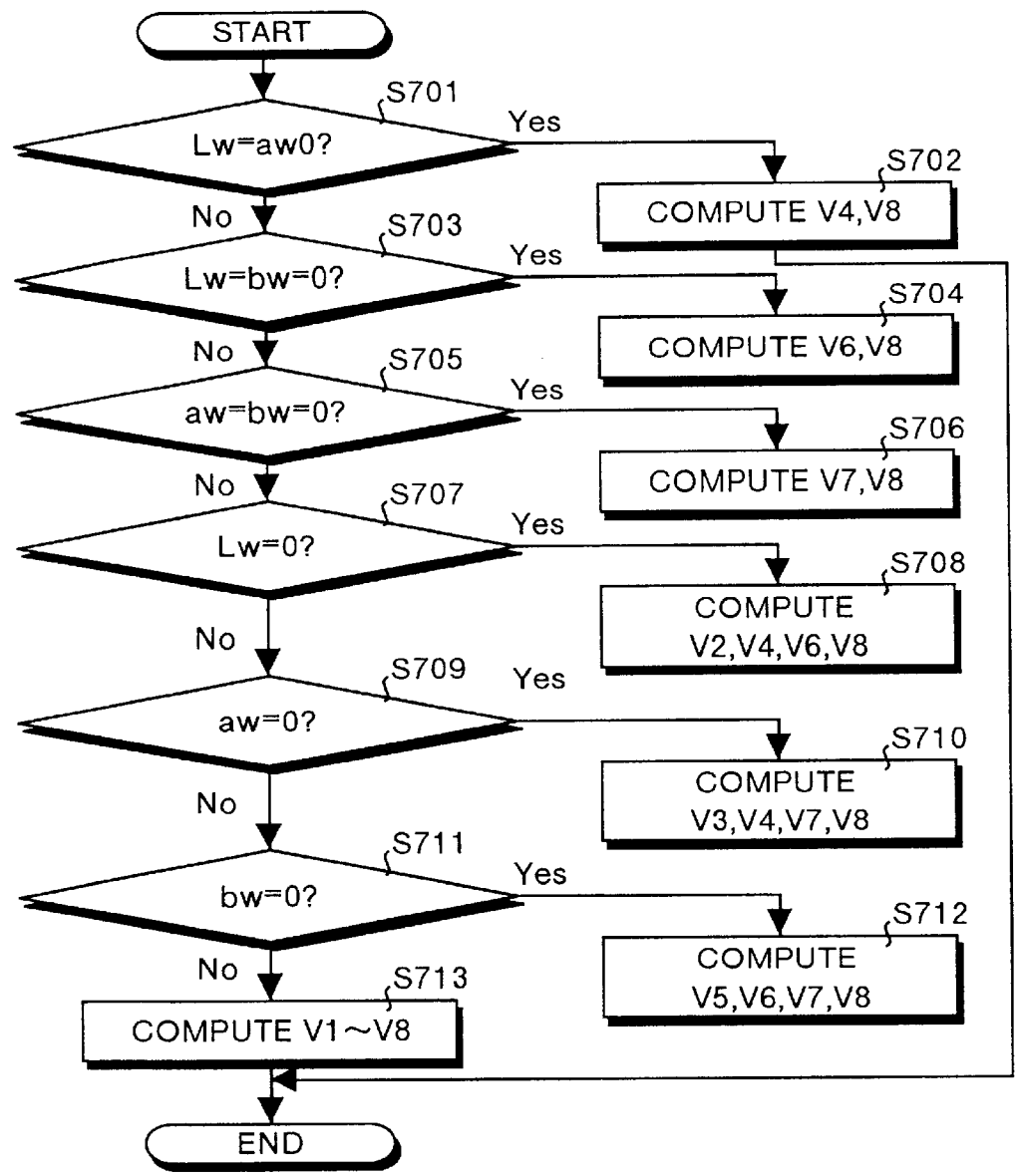
FIG. 13 is a flow chart showing a sequence of computing a conversion parameter executed by the conversion parameter computing section according to Embodiment 4 of the present invention.
Figure 15A:
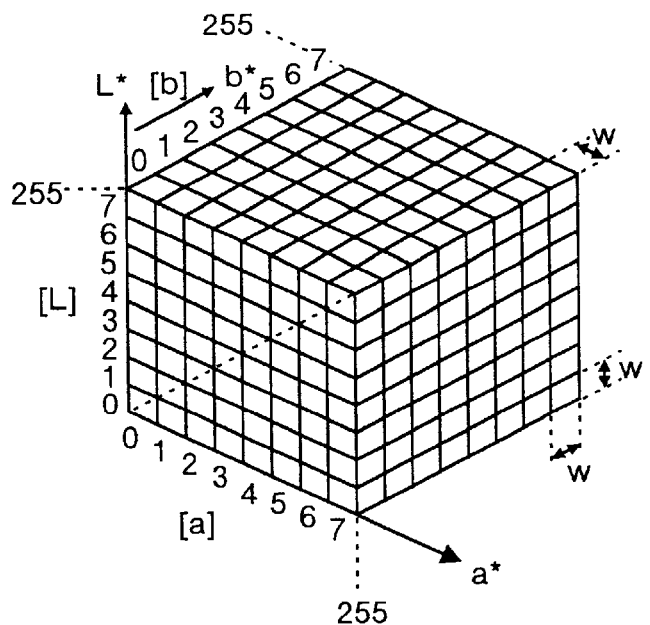
FIGS. 15A to 15C explain conventional color conversion from a color based on L*a*b value color expression system to a color based on CMY color expression system.
Figure 15B:
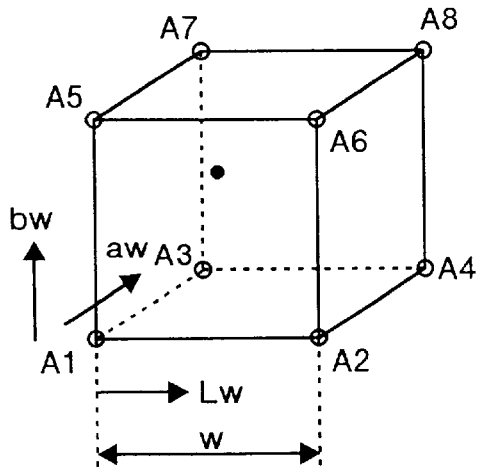
Figure 15C:
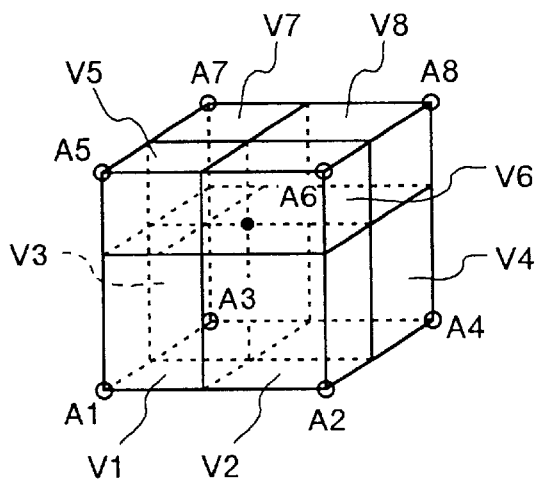

A sequence of operations for computing the conversion parameters executed by the conversion parameter computing section 11 according to Embodiment 4 will be explained here. FIG. 13 is a flow chart which shows this sequence of operations.

As shown in the figure, when computing the conversion parameters for one position (Lw, aw, bw) in a lattice space the conversion parameter computing section 11 determines whether the condition Lw=aw=0 is satisfied or not (step S701). When it is determined that the condition is satisfied (step S701, affirmative) then the two one-dimensional parameters V4 and V8 are computed and stored (step S702) and the processing is terminated. When it is determined that the above condition is not satisfied (step S701, negative) then it is determined whether the condition Lw=bw=0 is satisfied or not (step S703). When it is determined that this condition is satisfied (step S703, affirmative) then the two one-dimensional conversion parameters V6 and V8 are computed and stored (step S704) and the processing is terminated.

When it is determined that the above condition is not satisfied (step S703, negative) then it is determined whether the condition aw=bw=0 is satisfied or riot (step S705). When it is determined that this condition is satisfied (step S705, affirmative) then the two conversion parameters V7 and V8 are computed and stored (step S706) and the processing is terminated. When it is determined that the above condition is not satisfied (step S705, negative) then it is determined whether the condition Lw=0 is satisfied or not (step S707). When it is determined that this condition is satisfied (step S707, affirmative), then the four two-dimensional conversion parameters V2, V4, V6 and V8 are computed and stored (step S708) and the processing is terminated.

When it is determined that the above condition is not satisfied (step S707, negative), then it is determined whether the condition aw=0 is satisfied or not. When it is determined that this condition is satisfied (step S709, affirmative) then the four two-dimensional conversion parameters V3, V4, V7 and V8 are computed and stored (step S710) and the processing is terminated. When it is determined that the above condition is not satisfied (step S709, negative) then it is determined whether the condition bw=0 is satisfied or not (step S711). When it is determined that this condition is satisfied (step S711, affirmative) then the four two-dimensional conversion parameters V5, V6, V7 and V8 are computed and stored (step S712) and the processing is terminated. When it is determined that the above condition is not satisfied (step S711, negative) then all the eight three-dimensional parameters V1 to V8 are computed and stored (step S713) and the processing is terminated.

By executing a series of operations as described above, it is possible to store one-dimensional, two-dimensional, or three-dimensional conversion parameters according to how many of Lw, aw, and bw are equal to zero.

A sequence of operations for conversion from the L*a*b* value to CMY values executed by the color converting section 10 according to Embodiment 4 will be explained here. FIG. 14 is a flow chart which shows this sequence of operations.

As shown in this figure, at first when L*A*B* value for an input color is inputted (step S801), the lattice point identifying section 14 identifies lattice points forming a lattice space in which the L*a*b* value is present by using the color conversion table 13 (step S802). The intra-lattice position computing section 15 computes the position (Lw, aw, bw) in a lattice space in which the L*a*b* value is present (step S803)

The conversion parameter retrieving section retrieves the conversion parameters for the position (Lw, aw, bw) from the conversion parameter storing section 12 (step S804), and checks how many of Lw, aw, and bw are equal to zero (step S805). As a result, no one of Lw, aw, and bw is equal to zero, then the interpolation processing is executed using a volume of a rectangular parallelepiped as a conversion parameter (step S806). When one of Lw, aw, bw is equal to zero, then the interpolation processing is executed using an area of a surface as a conversion parameter (step S807). Finally, when two of Lw, aw, and bw are equal to zero, then the interpolation processing is executed using a ratio of string as a conversion parameter (step S808).

By executing a series of operations as described above CMY values corresponding to L*a*b* value can efficiently be outputted while reducing the memory capacity for storing conversion parameters according to types of conversion parameters stored in the conversion parameter storing section 12.

As described above, in the color converting apparatus according to Embodiment 4, the conversion parameter computing section 11 computes one-dimensional, two-dimensional, or three-dimensional conversion parameters according to how many of Lw, aw, and bw are equal to zero. The conversion parameter storing section 12 stores the computed conversion parameters. When L*a*b* value for an input color is inputted, the lattice point identifying section 14 identifies lattice points forming a lattice space in which the input color is present by using the color conversion table 13. The intra-lattice position computing section 15 computes the positions in the lattice space. The conversion parameter retrieving section 16 retrieves the conversion parameters from the conversion parameter storing section 12, and the interpolation section 17 outputs CMY values corresponding to L*a*b* value by one-dimensional, two-dimensional, or three-dimensional interpolation. Therefore, memory capacity required for the conversion parameter storing section 12 to store conversion parameters can further be reduced, and color conversion from the L*a*b* color expression system to the CMT color expression system can efficiently be executed. Especially, the memory capacity required for storing conversion parameters can be reduced to a half of that required in the conventional technology.

Embodiments 1 to 4 described above assume a case where color conversion is made from the L*a*b* color expression system to the CMY color expression system. However, the present invention is not limited to this configuration, and is applicable in any case where a color is converted from one color expression system to another color expression system. This color expression system is not limited to a three-dimensional color expression system, and is applicable to a four-dimensional or higher-dimensional color expression system.

As described above, with the present invention, the lattice space is divided into a partial space by taking as a reference the position present in that partial space and the conversion parameters corresponding to this position are computed and stored in the storing unit. When an input color for a first color space is accepted, the conversion parameters corresponding to the position of the input color in the lattice space are retrieved from the storing unit and an output color for a second color space is computed from the retrieved conversion parameters. Therefore, the required memory capacity can be reduced and color conversion can be executed efficiently.

With the present invention, a position of an input color in a lattice space in which the input color is present is determined and the conversion parameters corresponding to this computed position are retrieved from the storing unit. Then, an output color corresponding to the input color is computed by means of interpolation from the retrieved conversion parameters as well as from the output color for the second color space stored at each lattice point forming the lattice space in which the input color is present. Therefore, for instance, input color like the L*a*b* value can be converted to an output color like the CMY value.

With the present invention, conversion parameters corresponding to each position inside a partial space with one edge thereof equal to ½ of a lattice interval are computed. When any coordinate component of the computed position is larger than ½ of the lattice interval, then the conversion parameters corresponding to the position obtained by subtracting a value of this coordinate component from the lattice interval is taken as a new coordinate component and the conversion parameters corresponding to this new coordinate component are retrieved from the storing unit. Therefore, when a color conversion for a p-dimensional color space is executed then the memory capacity required for storing conversion parameters in the storing unit can be reduced to $½^p$ of that required in the conventional technology.

With the present invention, the conversion parameters for a position are computed only when the values of the coordinate components of that position present in a lattice space satisfy a prespecified order in size relation. Then, the order of the coordinate components is changed so that values of the coordinate components satisfy the prespecified order, and then conversion parameters corresponding to a position having the replaced new coordinate components are retrieved from the storing unit. Therefore, when color conversion for a p-dimensional color space is executed, then the memory capacity required for the storing unit to store the conversion parameters can be reduced to $1/p^n$. Especially, when combined with the invention described above, the memory capacity can be reduced to $1/(2^p \times p^n)$ With the present invention, when any of coordinate components of a position present in a lattice space is equal to ½ of the lattice interval then only a portion of a plurality of divided areas prepared by dividing a lattice space at this position as a reference are computed as conversion parameters. When conversion parameters corresponding to this position in a lattice space for an input color are to be retrieved from the storing unit, conversion parameters other than those that are retrieved are computed from the retrieved conversion parameters. Therefore, if q number of coordinate components are equal to ½ of the lattice interval, then the memory capacity required to store the conversion parameters in the storing unit can be reduced to $1/2^q$ of that required in the conventional technology.

With the present invention, when the position inside a partial space is present on a plane in the lattice space, then the areas of the regions obtained dividing the plane at this position is computed as a conversion parameter. Further, when the position inside the partial space is present on a string on the lattice space, then the lengths of the strings obtained by dividing this string at this position is computed as a conversion parameter. Then, interpolation processing is executed by using the string lengths, areas, or volumes according to a number of coordinate components equal to zero of the position in a lattice space for an input color. Therefore, when color conversion is carried out in a r-dimensional color space, then a memory capacity required for storing the conversion parameters in the storing unit can be reduced to $½^{(r-l)}$ as compared to that required in the conventional technology.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color converting apparatus comprising:
    a multi-dimensional conversion table containing output colors of a second color space corresponding to input colors of a first color space for lattice points spaced apart by a predetermined interval in a multi-dimensional transformation coordinate space;
    a conversion parameter computing unit that computes as conversion parameters regions obtained by dividing a lattice space at each of coordinate positions equally spaced apart, the lattice space formed with adjoining lattice points in the transformation coordinate space, the conversion parameters corresponding to the coordinate positions present in a partial space constituting a portion of the lattice space;
    a storing unit that stores the conversion parameters computed by the conversion parameter computing unit; and
    a color converting unit that retrieves the conversion parameters from the storing unit and converts an input color of the first color space into an output color of the second color space based on the retrieved conversion parameters, the conversion parameters corresponding to the coordinate positions in the lattice space of the input color,
    wherein the color converting unit has:
        a position computing unit for computing a position corresponding to the input color in the lattice space with the input color present therein;
        a retrieving unit for retrieving conversion parameters corresponding to the position computed by said position computing unit; and
        an interpolation unit for obtaining the output color corresponding to the input color from the conversion parameter retrieved by said retrieving unit as well as from an output color in a second space stored at the lattice points forming a lattice space with the input color present therein through interpolation;
    wherein said conversion parameter computing unit computes the conversion parameters corresponding to the positions present within a partial space with one edge thereof equal to ½ of the lattice interval, and
    wherein when each coordinate component of a position computed by said position computing unit is greater than ½ of the lattice interval then said retrieving unit retrieves from said storing unit the conversion parameters corresponding to a new coordinate component obtained by subtracting the coordinate component from the lattice interval.

2. The color converting apparatus according to claim 1; wherein said conversion parameter computing unit computes the conversion parameters corresponding to the position only when the coordinate components of the position present in the partial space satisfy a prespecified size relation; said retrieving unit rearranges the coordinate components so that values of coordinate components indicating a position in the lattice space for the input color satisfy a specified size relation and then retrieves the conversion parameters corresponding to a position having the new rearranged coordinate components.

3. A color converting apparatus according to claim 1; wherein when each coordinate component of a position present in the partial space is ½ of the lattice interval then said conversion parameter computing unit computes as the conversion parameter only a portion of a plurality of divided regions obtained by dividing the lattice space according to the position as a reference; and when conversion parameters corresponding to the position within the lattice space for the input color is to be retrieved from the storing unit then said retrieving unit computes the other conversion parameter from the conversion parameter retrieved from said storing unit.

4. A color converting apparatus according to claim 1; wherein when the position in the partial space is present on a plane of the lattice space then said conversion parameter computing unit computes as the conversion parameter the regions obtained by dividing the space at the position, and when the position in the partial space is present on a string in the lattice space then said conversion parameter computing unit computes as the conversion parameter the string lengths obtained by dividing the string at the position, and said interpolation computing unit executes processing for interpolation using a string length, an area, or a volume as a conversion parameter according to how many of the coordinate components of the position in the lattice space for the input color are zero.

5. A color converting method comprising:
- a step of preparing a multidimensional conversion table containing output colors of a second color space corresponding to input colors of a first color space for lattice points spaced apart by a predetermined interval in a multi-dimensional transformation coordinate space;
- a parameter computing step of computing as conversion parameters regions obtained by dividing a lattice space at each of coordinate positions equally spaced apart, the lattice space formed with adjoining lattice points in the transformation coordinate space, the conversion parameters corresponding to the coordinate positions present in a partial space forming a portion of the lattice space and storing the computed conversion parameters; and
- a color converting step of retrieving the conversion parameters stored and converting an input color of the first color space into an output color of the second color space based on the retrieved conversion parameters, the conversion parameters corresponding to the coordinate position in the lattice space of the input color, wherein said color converting step has:
- a position computing step of computing a position corresponding to the input color in the lattice space with the input color present therein;
- a retrieving step of retrieving conversion parameters corresponding to the position computed in said position computing step; and
- an interpolation step of obtaining the output color corresponding to the input color from the conversion parameter retrieved in said retrieving step as well as from an output color for the second color space stored at the lattice points forming a lattice space with the input color present therein through interpolation;

wherein conversion parameters corresponding to each position present in a partial space having an edge equal to ½ of the lattice interval are computed in said conversion parameter computing step and when each coordinate component of the position computed in said position computing step are greater than ½ of the lattice interval, and conversion parameters corresponding to a new coordinate component obtained by subtracting the old coordinate component from the lattice interval are retrieved.

6. The color converting method according to claim 5; wherein, the position present in the partial space has a first, second and third coordinate components, only if a value of the first coordinate component is not less than a value of the second coordinate component and at the same time a value of the second coordinate component is not less than a value of the third coordinate component then the conversion parameters corresponding to the position are computed in said conversion parameter computing step; and coordinate components of the position in the lattice space for the input color are rearranged according to a descending order of values of the coordinate components and conversion parameters corresponding to the position including the rearranged ones are retrieved as new coordinate components.

7. A color converting method according to claim 5; wherein when each coordinate component of a position present in the partial space is ½ of the lattice interval then only a portion of a plurality of divided regions obtained by dividing the lattice space at this position as a reference is computed as the conversion parameter in said conversion parameter computing step; and when conversion parameters corresponding to the position within the lattice space for the input color is to be retrieved then the other conversion parameters are computed from the retrieved conversion parameters.

8. The color converting method according to claim 5; wherein when the position in the partial space is present on a plane of the lattice space then an area obtained by dividing the plane at this position is computed as the conversion parameter in said conversion parameter computing step; and when the position in the partial space is present on a string in the lattice space then a string length obtained by dividing the string at this position is computed as the conversion parameter; and in said interpolation step the interpolation is performed using a string length, an area, or a volume as a conversion parameter according to how many of the coordinate components of the position computed in said position computing step are zero.

9. A computer-readable recording medium with a program recorded therein for making computer execute a color converting method, said method comprising:
- a step of preparing a multi-dimensional conversion table containing output colors of a second color space corresponding to input colors of a first color space for lattice points spaced apart by a predetermined interval in a multi-dimensional transformation coordinate space;
- a parameter computing step of computing as conversion parameters regions obtained by dividing a lattice space at each of coordinate positions equally spaced apart, the lattice space formed with adjoining lattice points in the transformation coordinate space, the conversion parameters corresponding to the coordinate positions present in a partial space forming a portion of the lattice space and storing the computed conversion parameters; and
- a color converting step of retrieving the conversion parameters stored and converting an input color of the first color space into an output color of the second color space based on tile retrieved conversion parameters, the conversion parameters corresponding to the coordinate position in the lattice space of the input color, wherein said color converting step has:
- a position computing step of computing a position corresponding to the input color in the lattice space with the input color present therein;
- a retrieving step of retrieving conversion parameters corresponding to the position computed in said position computing step; and
- an interpolation step of obtaining the output color corresponding to the input color from the conversion parameter retrieved in said retrieving step as well as from an output color for the second color space stored at the lattice points forming a lattice space with the input color present therein through interpolation;

wherein conversion parameters corresponding to each position present in a partial space having an edge equal to ½ of the lattice interval are computed in said conversion parameter computing step and when each coordinate component of the position computed in said position computing step are greater than ½ of the lattice interval, and conversion parameters corresponding to a new coordinate component obtained by subtracting the old coordinate component from the lattice interval are retrieved.

10. A color converting method comprising:

dividing a multidimensional lattice space into equally sized first regions, each of the equally sized first regions having a first region coordinate position, the lattice space being defined by lattice points;

defining at least one conversion parameter for each first region coordinate position such that the first regions have corresponding conversion parameters;

determining positional relationships between an input coordinate and the first regions and selecting a conversion parameter based on the positional relationships, the input coordinate being in a second region outside of the first regions; and converting an input color corresponding to the input coordinate position based on the conversion parameter defined for the selected given coordinate position, the input color being converted into an output color, wherein converting an input color comprises:

a position computing step of computing a position corresponding to the input color in the lattice space with the input color present therein;

a retrieving step of retrieving conversion parameters corresponding to the position computed in said position computing step; and an interpolation step of obtaining the output color corresponding to the input color from the conversion parameter retrieved in said retrieving step as well as from an output color for the second region stored at the lattice points forming the lattice space with the input color present therein through interpolation;

wherein conversion parameters corresponding to each position present in a partial space having an edge equal to ½ of the lattice interval are computed while defining at least one conversion parameter and when each coordinate component of the position computed in said position computing step are greater than ½ of the lattice interval, and conversion parameters corresponding to a new coordinate component obtained by subtracting an old coordinate component from the lattice interval are retrieved.

* * * * *

UNITED STATES PATENT AND TRADEMARK OFFICE
CERTIFICATE OF CORRECTION

PATENT NO. : 6,671,072 B1
DATED : December 30, 2003
INVENTOR(S) : Akiko Nagae et al.

It is certified that error appears in the above-identified patent and that said Letters Patent is hereby corrected as shown below:

<u>Title page, Item [54] and Column 1, lines 1 and 2,</u>
Title, insert comma after "APPARATUS"; and insert comma after "METHOD".

Signed and Sealed this

Sixth Day of April, 2004

JON W. DUDAS
*Acting Director of the United States Patent and Trademark Office*